United States Patent [19]

Arikawa

[11] Patent Number: 4,836,620
[45] Date of Patent: Jun. 6, 1989

[54] ANTI-SKID CONTROL APPARATUS FOR A VEHICLE BRAKING SYSTEM

[75] Inventor: Tetsuro Arikawa, Kanagawa, Japan

[73] Assignee: Nippon A B S, Ltd., Tokyo, Japan

[21] Appl. No.: 58,548

[22] Filed: Jun. 5, 1987

[30] Foreign Application Priority Data

Jun. 11, 1986 [JP] Japan .................. 61-135578

[51] Int. Cl.$^4$ .............................................. B60T 8/62
[52] U.S. Cl. ..................... 303/111; 303/105
[58] Field of Search ............ 188/181 A; 303/92, 100, 303/102, 103, 105, 106, 109, 110, 111, 113, 116

[56] References Cited

U.S. PATENT DOCUMENTS

| | | | |
|---|---|---|---|
| 3,674,317 | 7/1972 | Mangold . | |
| 3,907,377 | 9/1975 | Mayer . | |
| 3,980,346 | 9/1976 | Leiber . | |
| 4,418,966 | 12/1983 | Hattwig | 303/100 |
| 4,421,362 | 12/1983 | Shirai et al. | 303/115 |
| 4,451,096 | 5/1984 | Gygax | 303/109 |
| 4,489,382 | 12/1984 | Jonner et al. | 303/110 X |
| 4,637,664 | 1/1987 | Arikawa | 303/111 |

FOREIGN PATENT DOCUMENTS

| | | | |
|---|---|---|---|
| 0160342 | 7/1986 | Japan | 303/111 |
| 2182109 | 5/1987 | United Kingdom | 303/111 |

Primary Examiner—Duane A. Reger
Attorney, Agent, or Firm—Jones, Day, Reavis & Pogue

[57] ABSTRACT

Anti-skid control apparatus includes wheel speed sensors for front and rear wheels. First and second fluid pressure control valve devices control brake fluid pressures of wheel cylinders of the front and rear wheels, arranged between fluid pressure generating chambers of a tandem master cylinder and the wheel cylinders respectively. A control unit receives outputs of the sensors for measuring or judging the skid conditions of the wheels and for generating instructions for controlling the valve devices. A valve apparatus generates fluid pressure in accordance with the lower one of the brake fluid pressures of the front wheels controlled with the valve devices arranged between the wheel cylinders of the front wheels and those of the rear wheels. When the wheel speed difference between the front and rear wheels on the same side of the road becomes larger than a predetermined value, or when the deceleration of the one rear wheel becomes larger than a predetermined deceleration for the one rear wheel which is smaller than a second predetermined deceleration for the one front wheel running on the same side as the one rear wheel, before the one front or rear wheel on the same side first generates a brake relieving signal, the control unit generates the instruction which controls the first or second fluid pressure control valve device for the same side so as to maintain the pressure constant, or to reduce the rising gradient of the pressure.

11 Claims, 11 Drawing Sheets

ANTI-SKID CONTROL APPARATUS FOR A VEHICLE BRAKING SYSTEM

BACKGROUND OF THE INVENTION

1. Field of the Invention

This invention relates to an anti-skid control apparatus for a vehicle braking system which can prevent locking of the wheels.

2. Description of the Prior Art

An anti-skid control apparatus for a vehicle braking system is known that includes a fluid pressure control valve device arranged between a master cylinder and a wheel cylinder of a brake for the wheel, said fluid pressure control valve device receiving control signals of a control unit measuring the skid condition of the wheel to control the brake fluid pressure to the wheel cylinder; a hydraulic reservoir which, when the brake fluid pressure to the wheel cylinder is decreased with control of the fluid pressure control valve device, receives and stores the brake fluid discharged through the fluid pressure control valve device from the wheel cylinder; a pressure fluid supply conduit connecting the master cylinder with the fluid pressure control valve device; and a fluid pump for returning the brake fluid from the hydraulic reservoir into the pressure fluid supply conduit.

When the fluid pressure control valve device is provided for each of four wheels, and their fluid pressures are independently controlled, there is no problem on control operation. Or when the fluid pressure control valve device is provided for each of the front wheels, and for both of the rear wheels in common, there is no problem on control operation. In the latter case, the one common fluid pressure control valve device is controlled on the basis of the lower one of the speeds of the rear wheels.

However, in the above cases, three or four fluid pressure control valve devices are used. Accordingly, the whole anti-skid control apparatus is large-sized, and very heavy. Since the fluid pressure control valve device is expensive, the system is costly.

For example, it is considered that the brake fluid pressures of the front wheels are controlled by the two fluid pressure control valve devices respectively in the diagonal or X-type conduit system, and the brake fluid pressures of the rear wheels are controlled in common with the front wheels. However, when the vehicle runs on a road where the right and left sides are considerably different in frictional coefficient from each other, there is the fear that the one rear wheel being diagonal to the one front wheel on the higher frictional coefficient side is locked. In that case, the steering of the vehicle becomes unstable, and that is very dangerous.

Further, it is considered that proportioning valves are provided for the rear wheels, respectively. However, the brake fluid pressures of the rear wheels increases in proportion to the input fluid pressures to the proportioning valves. The fear of locking cannot be avoided.

Accordingly, in order to provide an anti-skid control apparatus for a vehicle braking system which can be small-sized and light, and can avoid the fear of locking of rear wheels, this applicant previously proposed an anti-skid control apparatus for a vehicle braking system which includes; a fluid pressure control valve device arranged between a master cylinder and a wheel cylinder of a brake for the wheel, said fluid pressure control valve device receiving control signals of a control unit measuring the skid condition of the wheel to control the brake fluid pressure to said wheel cylinder; a hydraulic reservoir which, when the brake fluid pressure to said wheel cylinder is decreased with control of said fluid pressure control valve device, reserves the brake fluid discharged through said fluid pressure control valve device from said wheel cylinder; a pressure fluid supply conduit connecting said master cylinder with said fluid pressure control valve device; and a fluid pump for returning the brake fluid from said hydraulic reservoir into said pressure fluid supply conduit; said fluid pressure control valve device being provided for a pair of front wheels, respectively, a valve apparatus receiving fluid pressures of wheel cylinders of said front wheels being arranged between said pair of front wheels and a pair of rear wheels, and when any one of said fluid pressure control valve devices starts to control, at least the fluid pressure of the one of said rear wheels, being at the same side as the one of said front wheels, the fluid pressure of the wheel cylinder of which is lower, is controlled in accordance with the lower one of the fluid pressures of the wheel cylinders of said front wheels by said valve apparatus U.S. Pat. No. 4,637,664. This assignee is the assignee of the following U.S. patent applications: Ser. Nos. 891,361, 903,498, 907,596, 916,406 and 57,802 for the anti-skid control apparatus using the above-described valve apparatus, in addition to the U.S. patents listed above.

With the above-described arrangements, both of the rear wheels can be securely prevented from locking. However, when the frictional coefficient of the road on which the vehicle is running is very high, the deceleration of the vehicle is rapidly increased with the brake. Accordingly, the vehicle or automobile sinks or falls forward. The forward falling of the automobile is the so called "nose-dive phenomenon". The falling or swing of the automobile occurs due to the inertia of the center of the gravity of the automobile, when the wheels are braked. The load distributions to the front and rear wheels change due to the rotational force around the contact points between the front or rear wheel and the ground. In that case, the load to the rear wheels becomes very small. Accordingly, although the pressure-reducing proportioning valves are arranged between the master cylinder and the rear wheels, the rear wheels tend to lock sooner than the front wheels. In order to prevent the locking of the rear wheels or rear wheel, the fluid pressure control valve device or devices are controlled to decrease the brake pressure. Since the pressure-reducing proportioning valves are arranged, the brake pressure to the front wheel should be decreased very much. The required braking force to the front wheel is much reduced. As the result, the braking distance of the automobile becomes very long.

When the frictional coefficients $\mu$ are different at the sides of the road, or for example, when the frictional coefficient $\mu$ of the left side is extremely high, and that of the right side is high, the one of the rear wheels running on the right side of the road tends to lock sooner than the other rear wheel. The brake pressure to the one rear wheel is decreased to prevent that wheel from locking. However, the brake pressure to the front wheel is decreased and the brake pressure to the wheels running on the higher $\mu$ side is increased. As the result, a yaw moment or torque is applied around the center of the gravity of the automobile. The automobile yaws. That is very dangerous.

SUMMARY OF THE INVENTION

Accordingly, it is an object of this invention to provide an anti-skid control apparatus for a vehicle braking system which can be small-sized and light, can avoid the fear of locking of rear wheels in any cases, can prevent the lowering of the braking force in the initial stage of the rapid brake on the very high $\mu$ road, and can decrease the initial yaw moment occurring in the decrease of the fluid pressure only to the low $\mu$ side of a road that has different frictional coefficients at both sides.

Another object of this invention is to provide an anti-skid control apparatus for a vehicle which can shorten the braking distance, can obtain the stable braking force, and can stabilize the running direction of the vehicle.

In accordance with an aspect of this invention, in an anti-skid control apparatus for a vehicle braking system including: (A) a pair of front wheels, and a pair of rear wheels, (B) wheel speed sensors associated with said wheels, respectively; (C) a first fluid pressure control valve device for controlling the brake fluid pressure of the wheel cylinder of one of said front wheels, arranged between a first fluid pressure generating chamber of a tandem master cylinder and said wheel cylinder of the one front wheel; (D) a second fluid pressure control valve device for controlling the brake fluid pressure of the wheel cylinder of another of said front wheels, arranged between a second fluid pressure generating chamber of said tandem master cylinder and said wheel cylinder of the other font wheel; (E) a control unit receiving outputs of said wheel speed sensors for measuring or judging the skid conditions of said front and rear wheels and for generating instructions for controlling said first and second fluid pressure control valve devices; and (F) a valve apparatus for generating a fluid pressure in accordance with the lower one of the brake fluid pressures of said front wheels controlled with said first and second fluid pressure control valve devices, being arranged between said wheel cylinders of front wheels and those of the rear wheels; the improvements in which, when the wheel speed difference between said front and rear wheels on the same side of the road becomes larger than a predetermined value, or when the deceleration of the one rear wheel becomes larger than the predetermined threshold deceleration for said one rear wheel which is smaller than a second predetermined threshold deceleration for the one front wheel running on the same side as said one rear wheel, before said one front or rear wheel on said same side first generates a brake relieving signal as the measuring or judging result of the skid condition, said control unit generates the instruction which controls said first or second fluid pressure control valve device for said same side so as to maintain the brake fluid pressure to the wheel cylinder at constant or to reduce the rising gradient of the brake fluid pressure to the wheel cylinder.

The foregoing and other objects, features, and advantages of the present invention will be more readily understood upon consideration of the following detailed description of the preferred embodiments of the invention, taken in conjunction with the accompanying drawings.

DESCRIPTION OF THE PREFERRED EMBODIMENTS

Figure 1:
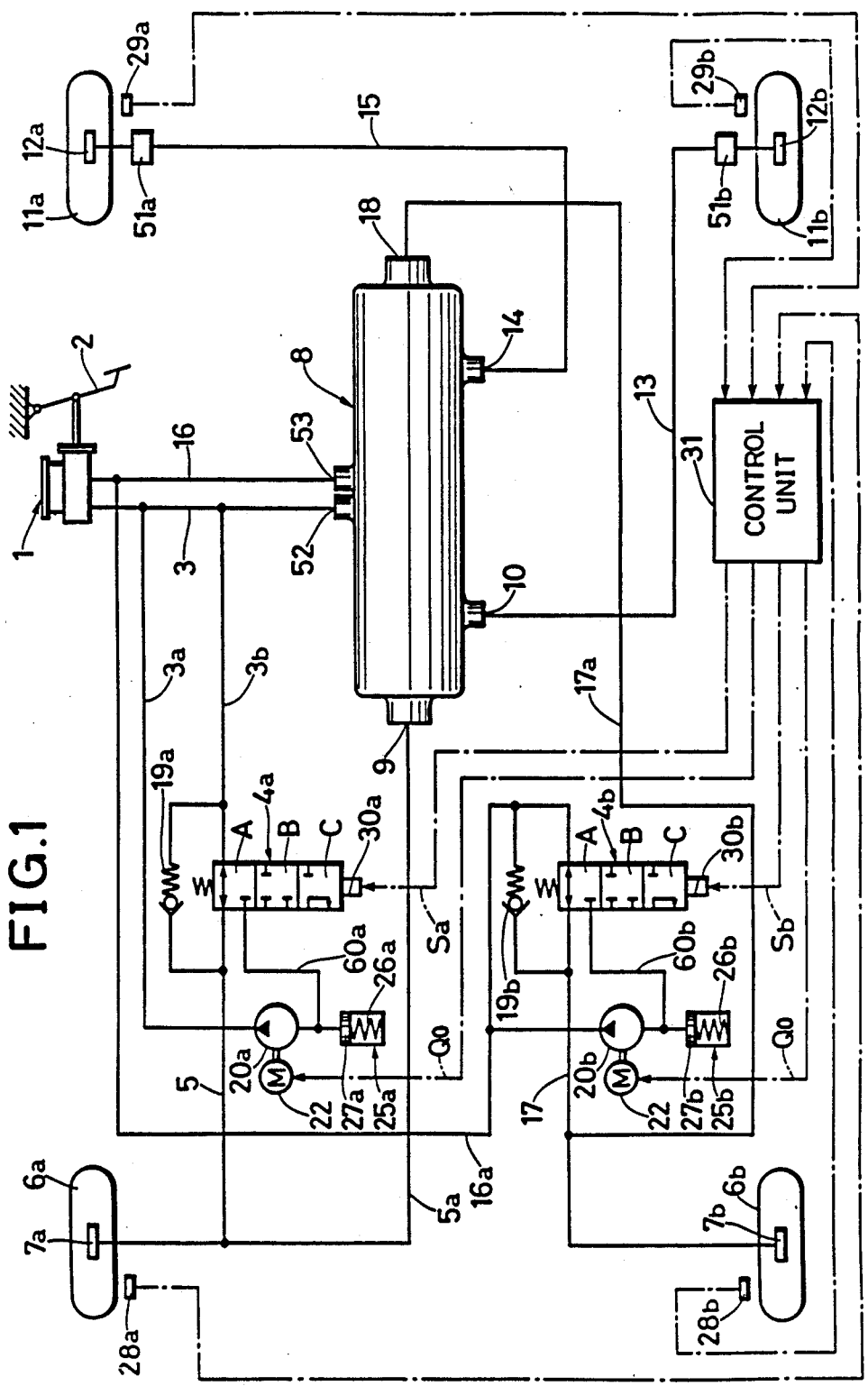
FIG. 1 is a schematic view of a anti-skid control apparatus according to an embodiment of this invention.

In FIG. 1, a brake pedal 2 is connected to a tandem master cylinder 1. One fluid pressure chamber of the tandem master cylinder 1 is connected to a wheel cylinder 7a of a right front wheel 6a through a conduit 3, a conduit 3b divided from the conduit 3, an electro-magnetic three position valve device 4a and a conduit 5. The conduit 5 is further connected to a first input port 9 of a valve apparatus 8 to be hereinafter described in detail. The first input port 9 normally communicates with a first output port 10 in the valve apparatus 8. The first output port 10 is connected to a wheel cylinder 12b of a left rear wheel 11b through a conduit 13 and a proportioning valve 51b.

Another fluid pressure chamber of the tandem master cylinder 1 is connected to a wheel cylinder 7b of a left front wheel 6b through a conduit 16a, an electro-magnetic three position valve device 4b and a conduit 17. The conduit 17 is further connected to a second input port 18 of the valve apparatus 8 through a conduit 17a. The second input port 18 normally communicates with a second output port 14 of the valve apparatus 8 through a conduit 17a. The second output port 14 is connected to a wheel cylinder 12a of a right rear wheel 11a through a conduit 15 and a proportioning valve 51a.

The proportioning valves 51a and 51b have well-known constructions. When the fluid pressure to the input side becomes higher than a predetermined valve, the fluid pressure is reduced at a predetermined rate, and transmitted to the output side.

Discharge openings of the valve devices 4a and 4b are connected through conduits 60a and 60b to hydraulic reservoirs 25a and 25b, respectively. The hydraulic reservoirs 25a and 25b include pistons 27a and 27b slidably fitted to a casings and relatively weak springs 26a and 26b. Reserving chambers of reservoirs 25a and 25b are connected to suction openings of fluid pressure pumps 20a and 20b.

Although the fluid pressure pumps 20a and 20b are schematically shown, each of them consist of a pair of casings, pistons slidably fitted to the casing, an electro-motor 22 reciprocating the piston, and check valves. Supply openings of the fluid pressure pump 20a and 20b are connected to the conduits 3a and 16a.

In FIG. 1, two electro-motors 22 are shown, but actually the fluid pressure pumps 20a and 20b are driven by one electro-motor in common.

Wheel speed sensors 28a, 28b, 29a and 29b are associated with the wheels 6a, 6b, 11a and 11b respectively, and they generate pulse signals having frequencies proportional to the rotational speeds of the wheels 6a, 6b, 11a and 11b. The pulse signals of the wheel speed sensors are supplied to a control unit 31 according to this invention.

Figure 2:
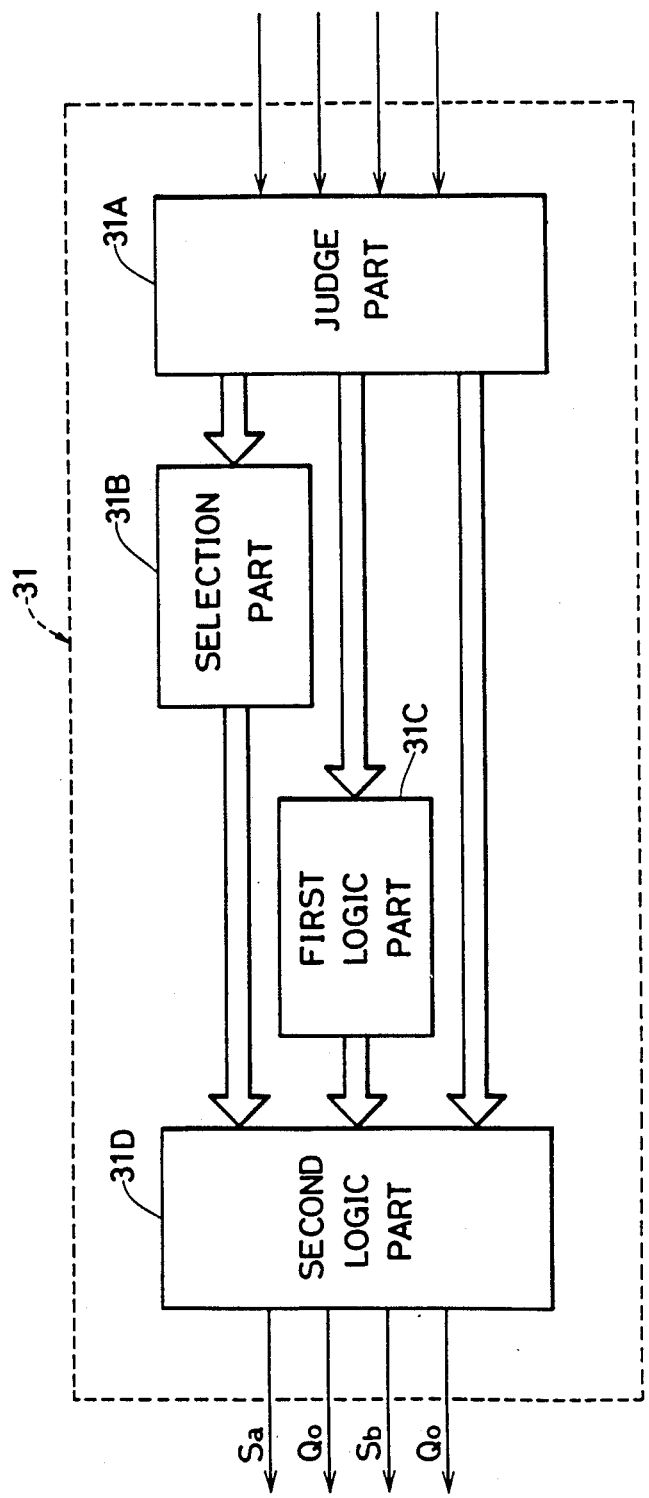
FIG. 2 is a block diagram of a control unit in FIG. 1.

Although described hereinafter in detail, the control unit 3, as shown in FIG. 2, consists of a judge part 31A, a selection part 31B and first and second logic part 31C and 31D. Output terminals of the wheel speed sensors 28a, 28b, 29a and 29b are connected to input terminals of the judge part 31A. The judge part 31A receives the wheel speed signals, judges them and supplies, the judge results to the selection part 31B and the logic part 31C, 31D. As will be hereinafter described, the outputs of the selection part 31B and the judge results are logically combined with each other in the logic part 31C and 31D. Control signals Sa and Sb, and motor drive signals Qo as the calculation or measurement results are generated from the control unit 31, and are supplied to solenoid portions 30a and 30b of the valve devices 4a and 4b and motors 22, respectively. Dashed lines represent electric lead wires.

Although schematically shown, the electromagnetic valves devices 4a and 4b have well-known constructions.

The valve devices 4a and 4b take anyone of three positions A, B and C in accordance with the current intensities of the control signals Sa and Sb.

When the control signals Sa and Sb are "0" in current level, the valve devices 4a and 4b take first positions A for increasing the brake pressure to the brake for the wheel, respectively. In the first position A, the master cylinder side and the wheel cylinder side are made to communicate with each other. When the control signals Sa and Sb are "½" in current level, the valve devices 4a and 4b take second positions B for maintaining the brake pressure to the brake at constant, respectively. In the second position B, the communications between the master cylinder side and the wheel cylinder side, and between the wheel cylinder side and the reservoir side are interrupted. When the control signals Sa and Sb are "1" in current level, the valve devices 4a and 4b take third positions C for decreasing the brake pressure to the brake, respectively. In the third position C, the communication between the master cylinder side and the wheel cylinder side is interrupted, while the communication between the wheel cylinder side and the reservoir side is made. The brake fluid is discharged through the conduit 60a and 60b into the reservoir 25a and 25b from the wheel cylinders 7a, 7b and 12a and 12b.

The control unit 31 further generates drive signal Qo for the motors 22 and 22. When any one of the control signals Sa and Sb becomes initially "1", the drive signal Qo is generated, and it is kept during the skid control operation. The drive signal Qo is supplied to the motors 22 and 22.

Figure 3:
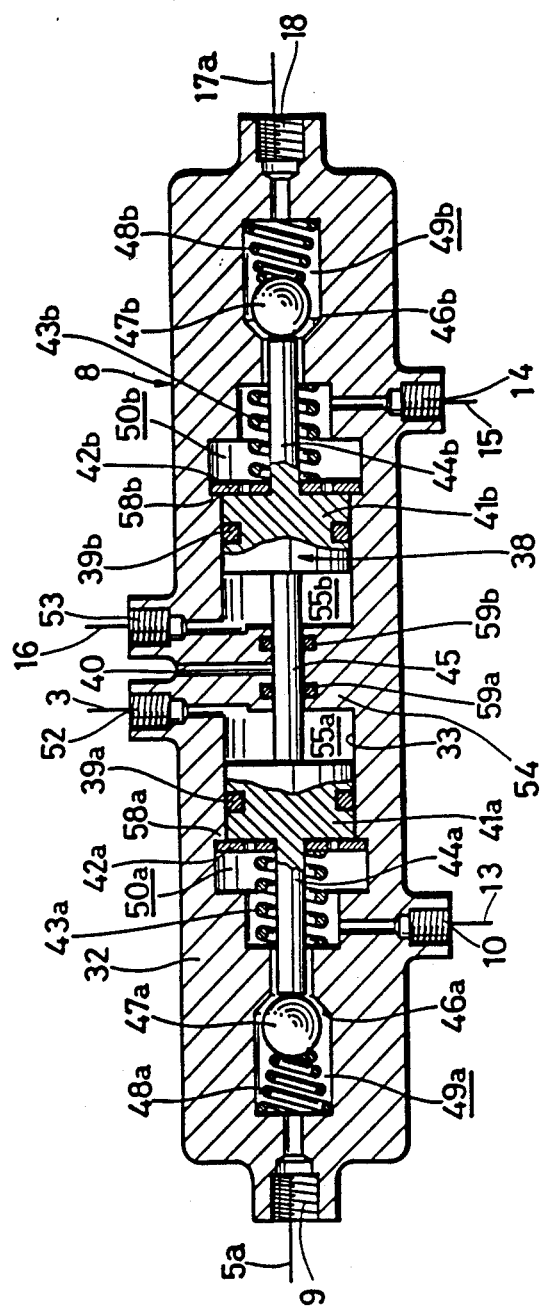
FIG. 3 is an enlarged cross-sectional view of a valve apparatus in FIG. 1.

Next, the details of the valve apparatus 8, to which the brake fluid pressures are applied from the wheel cylinders 7a and 7b of the front wheels 7a and 6b, will be described with reference to FIG. 3.

A stepped through hole 33 is axially formed in a casing 32 for the valve apparatus 8. The above-described first and second input ports 9 and 18 are formed in the left and right openings, respectively.

A stepped piston 38 provided with seal rings 39a and 39b is slidably fitted to a central position of the stepped hole 33. The stepped piston 33 is symmetrical, and it consists of a pair of large-diameter portions 41a and 41b, a pair of rod portions 44a and 44b and a small-diameter portion 45 combining integrally the larger-diameter portions 41A and 41b. The small diameter portion 45 is slidably fitted into a central hole of a partition 54 of the casing 32, sealed with seal rings 59a and 59b.

Spring receiving rings 42a and 42b are fitted to the rod portions 44a and 44b, and they receive springs 43a and 43b. The stepped piston 38 is urged to the center of the stepped hole 33 by the springs 43a and 43b, and so it is normally put at a neutral position as shown in FIG. 3. The spring receiving rings 42a and 42b normally contact with stepped portions 58a and 58b formed in the inner wall of the casing 32. The inside positions of the rings 42a and 42b are determined by them.

Normally, the rod portions 44a and 44b of the piston 38 are in contact with valve balls 47a and 47b which are positioned in input chambers 49a and 49b, and are urged inwards by springs 48a and 48b. In the condition shown, the valve balls 47a and 47b are separated from valve seats 46a and 46b by the rod portions 44a and 44b.

Output chambers 50a and 50b, and master cylinder pressure chambers 55a and 55b are formed at both sides of the large-diameter portions 41a and 41b of the piston 38. The output chambers 50a and 50b communicate always with the above-described output ports 10 and 14. The master cylinder pressure chambers 55a and 55b communicate always with the fluid pressure chambers of the tandem master cylinder 1 through connecting ports 52 and 53 and the conduits 3 and 16 connected to the ports 52 and 53. Small openings are formed in the spring receiving rings 42a and 42b, so that the larger-diameter portions 41a and 41b of the piston 38 can easily receive the fluid pressure at the outside surfaces.

According to this embodiment, the surfaces of the larger-diameter portions 41a and 42b of the piston 38 receiving fluid pressures from the output chambers 50a and 50b, and the master cylinder pressure chambers 55a and 55b are annular. The annular pressure-receiving surfaces are equal to each other in area. In other words, the diameters of the rod portions 44a and 44b are equal to the diameter of the smaller-diameter portions 45.

In FIG. 1, check valves 19a and 19b are connected in parallel with the electro magnetic valve devices 4a and 4b. They permit brake fluid to flow only in the direction from the wheel cylinder side towards the master cylinder side. Both sides of the valve devices 4a and 4b communicate with each other through throttling holes in the A positions. Accordingly, pressurized fluid is rapidly returned through the check valves 19a and 19b to the master cylinder 1 from the wheel cylinders 7a, 7b, 12a and 12b, when the brake is released.

Or when the brake pedal 2 is released from treading in the B or C positions of the valve devices 4a and 4b during the skid control, the brake fluid can be returned from the wheel cylinder side to the master cylinder side through the check valves 19a and 19b.

Next, the details of the judge part 31A in the control unit 31 will be described with reference to FIG. 4.

The judge part 31A receives the outputs of the sensors 28a, 28b, 29a, 29b to judge the skid conditions of the wheels 6a, 6b, 11a, 11b. The judge circuits for the respective wheels 6a, 6b, 11a, 11b are the same in construction. FIG. 4 shows only the judge circuit for the right front wheel 6a. It will be representatively described hereinafter. However, it is partially in common with the judge circuit for the left rear wheel 11b of the same conduit system. Accordingly, only a part of the judge circuit for the left rear wheel 11b is shown in FIG. 4. The signals from the wheel speed sensors 28a and 29b are supplied to wheel speed signal generators 61a and 61b. Digital or analogue outputs proportional to the wheel speeds are obtained from the wheel speed signal generator 61a and 61b and they are supplied to differentiators 62a, 62b, slip signal generators 72a, 72b and a slip ratio setting circuit 69. The circuit 69 is in common, in the judge circuits for the front and rear wheels 6a and 11b of the same conduit system. It consists of an approximate vehicle speed signal generator 66 and multipliers 67 and 68. The higher of the outputs of the wheel speed signal generators 61a and 61b is selected, and an approximate vehicle speed signal is formed on the basis of the higher one, in the approximate vehicle speed signal generator 66. For ,example, multiplier numbers 0.85 and 0.70 are set in the multipliers 67 and 68, respectively. Output terminals of the slip ratio setting circuit 69 are connected to change-over circuits 70a and 70b. In the circuits 70a and 70b, movable contacts are normally connected to the output sides of the multiplier 68. Output terminals of the change-over circuits 70a and 70b are connected to the slip signal generators 72a, 72b. The outputs of the change-over circuits 70a and 70b, therefore, the values of (the approximate vehicle speed x the output 0.85 or 0.70 of the multiplier 67 or 68) are compared with the wheel speeds as the outputs of the wheel speed signal generators 61a and 61b, in the slip signal generators 72a and 72b. When the formers are smaller than the latters, the slip signal generators 72a and 72b generate slip signals λ. Since the judge circuits are the same for the left rear wheel 11b and right front wheel 6a, hereinafter only the judge circuit for the right front wheel 6a will be described.

Hereinafter, the suffixes b, c and d are appended to the reference numerals for the corresponding parts of the judge circuits for the left rear wheel 11b, the left front wheel 6b and the right rear wheel 11a, respectively. For example, the slip signal generators are denoted by the reference marks 72b, 72c and 72d for the left rear wheel 11b, left front wheel 6b and right rear wheel 11a, respectively.

The differentiator 62a receives the output of the wheel speed signal generator 61a and differentiate-it with respect to time. The output of the differentiator 62a is supplied to a deceleration signal generator 63a, and to first and second acceleration signal generators 64a and 65a. A predetermined threshold deceleration (for example, $-1.4g$) is set in the deceleration signal generator 63a, and it is compared with the output of the differentiator 72a. Predetermined threshold accelerations (for example, 0.5 g and 7 g) are set in the first and second acceleration signal generators 64a and 65a respectively and they are compared with the output of the differentiator 62a. When the deceleration of the wheel becomes larger than the predetermined threshold deceleration ($-1.4g$), a deceleration signal $-b$ is generated from the deceleration signal generator 63a. When the acceleration of the wheel becomes larger than the predetermined threshold acceleration (0.5 g) or (7 g), an acceleration signal $+b_1$ or $+b_2$ is generated from the acceleration signal generator 64a or 65a.

An output terminal of the first acceleration signal generator 64a is connected to negation input terminals (indicated by circle O) of AND gates 73a, 78a, and a first input terminal of an OR gate 82a. An output terminal of the AND gate 78a is connected to an input terminal of a pulse generator 80a and an input terminal of an AND gate 81a. An output terminal of the pulse generator 80a is connected to a negation input terminal of the AND gate 81a. A stepwise brake-increasing signal generator (U) is constituted by the acceleration signal generator 64a, the pulse generator 80a, the OR gate 82a, and the AND gate 81a, and it generates pulse signals to slowly increase the brake pressure. The width of the first pulse is so designed as to be larger than that of the following pulses in the pulse generator 80a. Thus, the insufficiency of the braking force is prevented.

The output terminal of the deceleration signal generator 63a is connected to a second input terminal of the OR gate 82a. The output terminal of the AND gate 81a is connected to the third input terminal of the OR gate 82a. The output terminal of the slip signal generator 72a is connected to the other input terminal of the AND gate 73a. The output terminal of the AND gate 73a is connected to one input terminal of an OR gate 76a. An output terminal of an AND gate 75a is connected to another input terminal of the OR gate 76a. The output terminal of the deceleration signal generator 63a is connected to one input terminal of the AND gate 75a and an output terminal of an OFF delay timer 86a is connected to another input terminal of the AND gate 75a. The delay time of the OFF delay timer 86a is sufficiently long. Once the output of the OFF delay timer 86a becomes "1", it is maintained during the anti-skid control operation. An output terminal of the OR gate 76a is connected to an input terminal of the OFF delay timer 86a, and further connected to one input terminal of an OR gate 87a. The output terminal of the OFF delay timer 86a is connected to another negation input terminal of the OR gate 87a.

An output terminal of the OR gate 87a is connected to one input terminal of a counter 88a, and the output terminal of the AND gate 81a of the stepwise brake-increasing signal generator U is connected to another input terminal of the counter 88a. Pulses from the AND gate 81a are counted by the counter 88a. When the counted number reaches a predetermined number, the output of the counter 88a becomes "1". And when the output of the OR gate 87a becomes "1", the content of the counter 88a is reset.

The output terminals of the deceleration signal generator 63a, first acceleration signal generator 64a, and pulse signal generator 80a are further connected to the respective input terminals of an OR gate 71a. The change-over circuit 70a is changed over by the output of the OR gate 71a. When the output of the OR gate 71a becomes "1", the movable contact of the change-over circuit 76a is changed over to the output side of the multiplier 67.

The output terminal of the OR gate 82a is connected to one input terminal of an AND gate 83a, and the output terminal of the second acceleration signal generator 65a is connected to another negation input terminal. The output terminal of the AND gate 83a is connected to one input terminals of an AND gate 84a and OR gate 85a. The output terminal of the OR gate 76a is connected to another negation input terminal of the AND gate 84a and to another input terminal of the OR gate 85a.

The output terminal of the AND gate 75a is connected to an OFF delay inner 77a. The output terminal thereof is connected to a fourth input terminal of the OR gate 82a, another OFF delay timer 131a and further a negation input terminal of an AND gate 130a. The output terminal of the OFF delay timer 131a is connected to another input terminal of the AND gate 130a.

The judge circuit for the right front wheel 6a is constructed as above described. Ten kinds of signals are taken out from this circuit. They will be denominated as shown in the right end of FIG. 4. The output signal of the second acceleration signal generator 65a is denoted as $+b_2VR$, that of the first acclerator signal generator 64a as $+b_1VR$, that of the AND gate 84a as EVVR, those of the OR gates 85a and 76a as EAVR and AVVR, respectively, that of the OFF delay timer 86a as AVZVR, that of the counter 88a as CEVR, that of the deceleration signal generator 63a as $-bVR$, that of the AND gate 81a as PLVR, and that of the slip signal generator 72a as $\lambda VR$. The letter "V" means "front side", and the letter "R" means "right side".

The judge circuits for the left rear wheel 11b, the left front wheel 6b and the right rear wheel 11a are constructed in the similar manner, respectively.

However, predetermined deceleration thresholds set in the deceleration signal generators 63b and 63d for the rear wheels 11a, 11b are smaller than those set in the deceleration signal generators 63a and 63c for the front wheels 6a, 6b. The ten kinds of signals $+b_2HL$, $+b_1HL$, EVHL, EAHL, AVZHL, AVHL, CEHL, PLHL, $-bHL$ and $\lambda HL$ are taken out from the judge circuit for the left rear wheel 11b, where the letter "H" means "rear side" and the letter "L" means "left side". Similarly $+b_2VL$, $+b_1VL$, EVVL, EAVL, AVZVL, AVVL, CEVL, PLVL, $-bVU$ and $\lambda VL$, and $+b_2HR$, $+b_1HR$, EVHR, EAHR, AVZHR, AVHR, CEHR, PLHR, $-bHR$ and $\lambda HR$ are taken out from ten judge circuits for the left front wheel 6b and the right rear wheel 11a, respectively.

Next, the details of the selection part 31B of the control unit 31 will be described with reference to FIG. 5. With respect to the rear wheels 11a and 11b. The output signals EVHR, EVHL, AVZHR, AVZHL (negations of the AVZHR, AVZHL, respectively), CEHR, CEHL, AVHR, AVHL, EAHR and EAHL from the judge part 31A are supplied to the selection part 31B. The output signals EVHR and EVHL are supplied to one input terminal of each of the AND gates 90a and 90b, respectively and input terminals of an OR gate 93. The output signals AVZHR and AVZHL are supplied to one input terminal of OR gate 91a and 91b, respectively. The output signals CEHR and CEHL are supplied to other input terminals of the OR gates 91a and 91b. Output terminals of the OR gates 91a and 91b are connected to reset terminals R1 and R2 of flip-flops 89a and 89b, respectively.

The flip-flops 89a and 89b are of the D-type. The output signals AVHR and AVHL are supplied to set terminals S1, S2 of the flip flops 89a and 89b, and they are further supplied to an OR gate 96.

The output signals EAHR and EAHL are negated, and then supplied to clock terminals C1, C2 of the flip-flops 89a, 89b. Output terminals Q1, Q2 of the flip-flops 89a, 89b are connected to other input terminals of the AND gate 90a, 90b. Negation output terminals $\bar{Q}_1$, $\bar{Q}_2$ are connected to data terminals D2 and D1 of other flip-flops 89b and 89a, and further they are connected to input terminals of an AND gate 92. An output terminal of the OR gate 93 is connected to the remaining one input terminal of the AND gate 92. Output terminals of the AND gates 90a, 90b, 92 are connected to input terminals of an OR gate 94, respectively. An output terminal of the OR gate 94 is connected to one input terminal of an AND gate 95. An output terminal of the OR gate 96 is connected to another negation input terminal of the AND gate 95. Output terminals of the AND gate 95 and OR gate 96 are connected to input terminals of an OR gate 97, respectively.

The output signals EVHR and EVHL are further supplied to one negation input terminal of each of the AND gates 98a and 98b, and to other input terminals of the other AND gates 98b and 98a. Output terminals of the AND gates 98a and 98b are connected to a set terminals of a flip flop 100, and a reset terminal R thereof. A signal SLA is obtained from an output terminal Q of the flip -flop 100, and it is supplied to the subsequent logic part 31C. An output f of the AND gate 95 is denominated as EVH, that g of the OR gate 97 as EAH, and that e of the OR gate 96 as AVH. They are supplied to the subsequent logic part 31C. Thus, first select-low control signals EVH, EAH and AVH are formed from the judge results of the skid conditions of both of the rear wheels 11a and 11b.

Next, the first logic part 31C of the control unit 31 will be described in detail with reference to FIG. 6.

This circuit consists mainly of subtractors 120a and 120b, comparators 121a and 121b receiving outputs of the subtractors 120a and 120b, reference generators 122a and 122b connected to other input terminals of the comparators 121a and 121b and OR gates 133a and 133b. Output terminals of the comparators 121a and 121b are connected to one input terminal of each of the OR gates 133a and 133b. Output terminals of the deceleration signal generators 63b and 63d are connected through OFF delay timers 132a and 132b to other input terminals of the OR gates 133a and 133b for the rear wheels 11a and 11b. As above described, the predetermined deceleration thresholds set in the deceleration signal generators 63b, 63d are smaller than those set in the deceleration signal generators 63a and 63c for the front wheels 11a and 11b.

Output terminals of the OR gates 133a and 133b are connected to one input terminal of each of the AND gates 123a and 123b. Output terminal of NOR gates 124a and 124b are connected to other input terminals of the AND gates 123a and 123b. The signals AVVL, AVHL, and AVVR, AVHR are supplied through OFF delay timers 125a, 126a and 125b, 126b to input terminals of the NOR gates 124a and 124b, respectively.

Output signals $V_{VL}$, $V_{HL}$ of the wheel speed signal generators 61c, 61b for the left front and rear wheels 6b and 11b are supplied to the one subtractor 120a, while output signals $V_{VR}$, $V_{HR}$ of the wheel speed signal generators 61a, 61d for the right front and rear wheels 6a and 11a are supplied to the other subtractor 120b.

In the subtractors 120a and 120b, the differences of the wheel speeds $(V_{VL}-V_{HL})$ and $(V_{VR}-V_{HR})$ are calculated, respectively. The results of the subtractors 120a and 120b are supplied to the one input terminals of the comparators 121a and 121b. Values representing predetermined wheel speed differences (for example 10 km/hour) equal to each other are set in the reference generators 122a and 122b, and are supplied to the other input terminals of the comparators 121a and 121b. When the outputs of the subtractors 120a and 120b are larger than the values of the reference generators 122a and 122b, the outputs of the comparators 121a and 121b are "1". And when the formers are smaller than the latters, the outputs of the comparator 121a and 121b are "0". Output signals EV1, EV2 of the AND gates 123a, 123b, and those NA1, NA2 of the NOR gates 124a, 124b are supplied to the sequent second logic part 31D.

Next, the second logic part 31D of the control unit 31 will be described in detail with reference to FIG. 7.

The logic part 31D is constructed in nearly symmetrical manner with respect to the right and left wheels.

The input signals $+b_1HL$, $+b_1HR$, $\lambda HL$, $\lambda HR$, CEVL, CEVR, AVZVL, AVZVR, EVVL, EVVR, AVVL, AVVR, EAVL, EAVR, CEHL, CEHR, AVHL, AVHR, PLHL, PLHR, PLVL, PLVR are supplied from the judge part 31A. The input signals EV1, EV2, NA1, NA2 are supplied from the first logic part 31c. And the input signals EVH, AVH, EAH and SLA are supplied from the selection part 31B.

The signals CEVL and CEVR are supplied to one input terminals of OR gates 105a and 105b. The signals AVZVL and AVZVR are supplied to negation input terminals of the OR gate 105a and 105b. Output terminals of the OR gates 105a and 105b are connected to reset terminals of flip-flops 101a and 101b. The signals EVVL and EVVR are supplied to input terminals of AND gates 103a, 103b and OR gates 107a and 107b.

The signals AVVL and AVVR are supplied to set terminals S of the flip-flops 101a and 101b, and to one input terminal of each of OR gates 111a and 111b. The signals EAVL and EAVR are negated and then supplied to clock terminals C of the flip-flops 101a and 101b. Output terminals Q of the flip-flops 101a and 101b are connected to other input terminals of the AND gates 103a and 103b. Q terminals of the flip-flops 101a and 101b are connected to first input terminals of AND gates 108a and 108b, and further to data terminals D of other flip-flops 102a and 102b. Similarly, Q terminals of the flip-flops 102a and 102b are connected to data terminals D of the other flip-flops 101a and 101b, and they are connected to third input terminals of the AND gates 108a and 108b. Output terminals of the OR gates 107a and 107b are connected to second input terminals of the AND gates 108a and 108b.

The signals AVHL and AVHR are supplied to set terminals S of the flip-flops 102a and 102b. Q output terminals of the flip-flops 102a and 102b are connected to one input terminal of each of the AND gates 104a, 104b and 112a and 112b. Further, they are connected to third input terminals of the OR gates 106b and 106a. Output terminals of the AND gates 104a and 104b are connected to third input terminals of OR gates 109a and 109b. Output terminals of the AND gates 103a, 103b and 108a, 108b are connected to first and second input terminals thereof, respectively.

Output terminals of the AND gates 112a and 112b are connected to other input terminals of the OR gate 111a and 111b. Output terminals of the OR gates 109a, 109b and 111a, 111b are connected to third input terminals of OR gates 144a, 144b and to one negation input terminals of AND gates 110a, 110b.

The signals AVHL and AVHR are further connected to third input terminals of AND gates 113b and 113a. The signals PLHL, PLVL and PLHR, PLVR are supplied to first and second input terminals of the AND gates 113a and 113b, respectively. Output terminals of the AND gates 113a and 113b are connected to second input terminals of the OR gates 106a and 106b. The signals CEHL and CEHR are supplied to first input terminals of the OR gates 106a and 106b.

The signal EVH is supplied to one input terminal of each of AND gates 114a and 114b, and further to the other input terminals of the AND gates 104a and 104b. Output terminals of the AND gates 114a and 114b are connected to the other input terminals of the OR gates 107a and 107b. The signal SLA, as it is, is supplied to another input terminal of the one AND gate 114a, while the signal SLA is negated, and then supplied to another input terminal of the other AND gate 14b. The signal AVH is supplied to other input terminals of the AND gates 112a and 112b. And the signal EAH is negated and then supplied to clock terminals C of the flip-flops 102a and 102b.

In the above-described manner the first select-low control signals are logically combined with the judge results of the front wheel running on the frictionally low side of the road, to form second select-low control signals.

The output signals EV1 and EV2 from the first logic part 31C are supplied to OFF delay timers 140a, 140b, first negation input terminals of AND gates 141a, 141b and first input terminals of OR gates 144a, 144b. The output signals NA1 and NA2 from the first logic part 31C are supplied to third input terminals of the AND gates 141a, 141b. Output terminals of the OFF delay timers 140a, 140b are connected to second input terminals of the AND gates 141a, 141b.

The output signals $+b_1HL$, $+b_1HR$ and $\lambda HL$, $\lambda HR$ from the judge part 31A are supplied to fourth and fifth negation input terminals of the AND gates 141a, 141b, respectively.

Output terminals of the AND gates 141a, 141b are connected to negation input terminals of AND gates 143a, 143b and pulse generators 142a, 142b. Output terminals of the pulse generators 142a, 142b are connected to other input terminals of the AND gates 143a, 143b. Output terminals of the AND gates 143a, 143b are connected to second input terminals of the OR gates 144a, 144b. Output terminals of the OR gates 144a, 144b are connected to other input terminals of the AND gates 110a, 110b.

Output signals EV' and EV of the AND gates 110a and 110b at the last stage of the logic part 31C correspond to the control signals Sb, Sa of the current level "½", and they are supplied to the solenoid portion 30b and 30a of the change-over valves 4b and 4a in FIG. 1, respectively. Output signals AV' and AV of the OR gates 111a and 111b at last stage of the logic part 31C correspond to the control signals Sb, Sa of the current level "1", and they are supplied to the solenoid portions 30b and 30a of the change-over valves 4b and 4a in FIG. 1, respectively.

Figure 6:
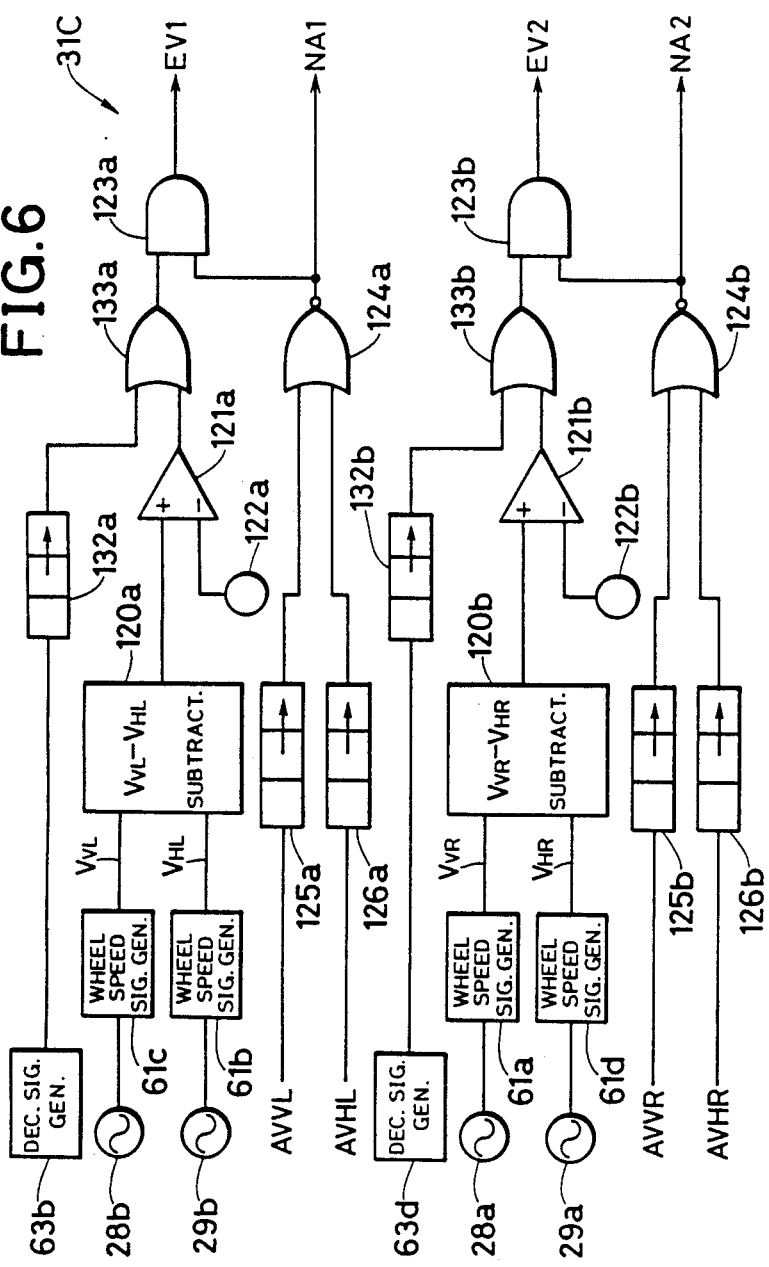
FIG. 6 is a circuit diagram of a first logic part in FIG. 2.
Figure 7:
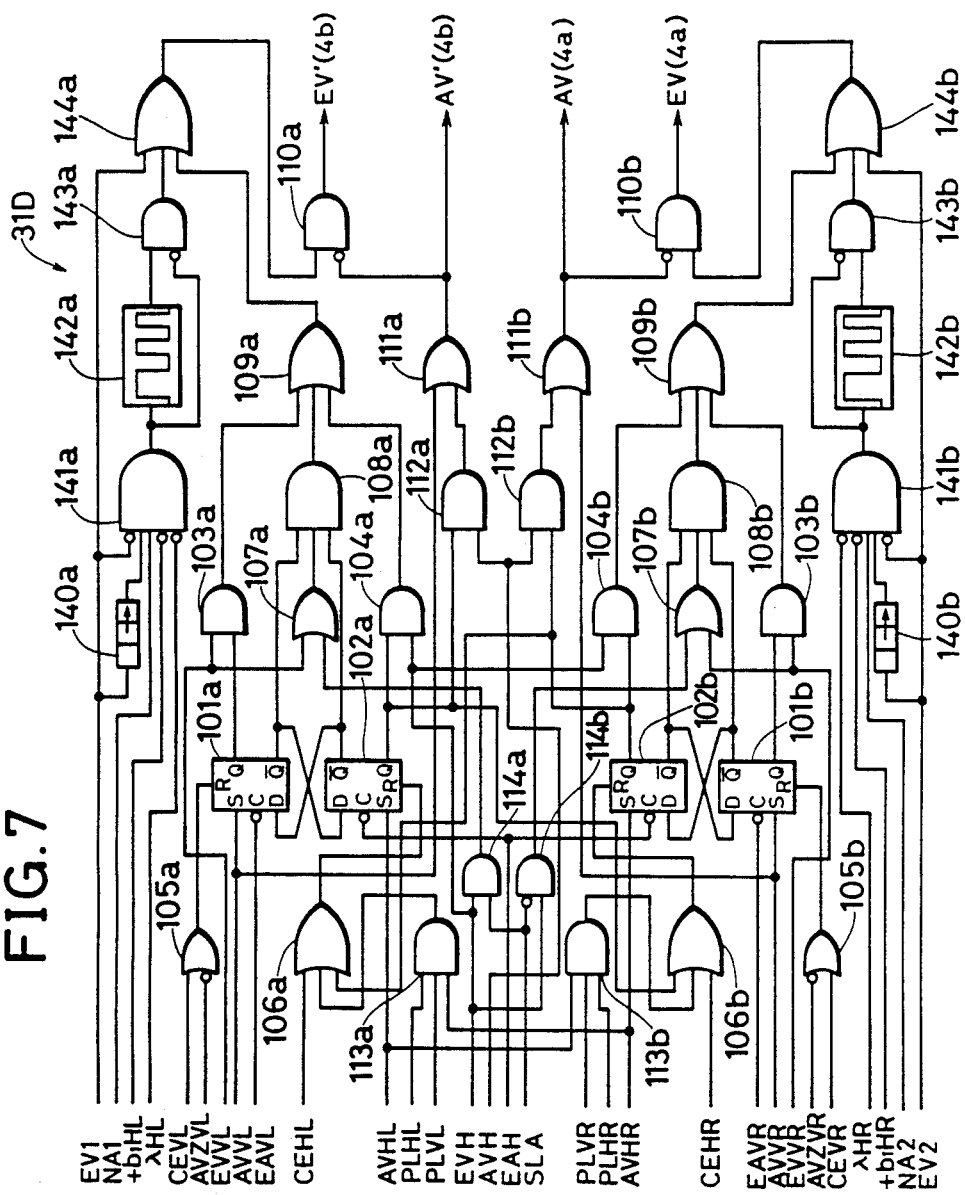
FIG. 7 is a circuit diagram of a second logic part in FIG. 2.

Although not shown in FIG. 6, the logic part 31C includes a motor drive circuit shown in FIG. 7. It consists of an OR gate 145 and an amplifier 146 connected to an output terminal of the OR gate 145. The signals AVZVR, AVZHL, AVZVL and AVZHR are supplied to input terminals of the OR gate 145. An output Qo of the amplifier 146 is supplied to the motor 22 in FIG. 1.

Next, there will be described operations of the above described anti-skid apparatus.

It is now assumed that both of the conduit systems are in order, and the wheels 6a, 6b, 11a and 11b run on the road which is uniform in normal frictional coefficient.

The vehicle driver treads the brake pedal 2. At the beginning of the braking, the control signals Sa and Sb are "0" from the control unit 31. Accordingly, the valve devices 4a and 4b are in the A-position. Pressurized fluid is supplied from the master cylinder 1 to the wheel cylinders 7a and 7b of the front wheels 6a and 6b through the conduits 3, 16, the valves devices 4a, 4b and the conduits 5, 17. Further, it is supplied to the wheel cylinders 12a and 12b of the rear wheels 11a and 11b through the first and second input ports 9, 18, the input chambers 49a, 49b, the output chambers 50a, 50b, the first and second output ports 10, 14 in the valve apparatus 8, the conduits 13 and 15 and the proportioning valves 51a and 51b. Thus, the wheels 6a, 6b, 11a and 11b are braked.

The fluid pressures of the fluid pressure generating chambers of the master cylinder 1 rise at substantially the same rate. Accordingly, the pressures of the master cylinder pressure chambers 55a and 55b are substantially equal to each other in the valve apparatus 8. Further, the pressures of the output chambers 50a and 50b, and therefore the input chambers 49a and 49b, when the valve balls 47a and 47b are separated from the valve seats 47a and 46b, are substantially equal to each other. Accordingly, the piston 38 is not moved, and remains positioned at the shown neutral position.

When the deceleration or slip ratio of the wheels 6a, 6b, 11a and 11b becomes higher than the predetermined deceleration or slip ratio with the increase of the brake fluid pressure, the control signals Sa and Sb become high level "1" or middle level "½". The solenoid portions 30a and 30b are energized.

Although operations of the control unit 31 according to this invention will be described hereinafter, first operations of the valve apparatus will be described at the control signals Sa, Sb = "1" and "½".

When the control signals Sa, Sb become "1", the valves 4a and 4b take the third position C. The conduits 3 and 16 are interrupted from the conduits 5 and 17, respectively. However, the conduits 5 and 17 are made to communicate with the conduits 60a and 60b. The pressurized fluid is discharged from the wheel cylinders 7a and 7b of the front wheels 6a and 6b into the hydraulic reservoirs 25a and 25b through the conduits 5, 17, 60a and 60b. The pressurized fluid from the wheel cylinders 12a and 12b of the rear wheels 11a and 11b is discharged through the conduits 15, 13, the output ports 14, 10, the output chambers 50a, 50b, the input chambers 49a, 49b, the input ports 18, 9 in the valve apparatus 8, and the conduits 17a, 5a, 60a and 60b, into the hydraulic reservoirs 25a and 25b. Thus, the brakes of the wheels 6a, 6b, 11a and 11b are relieved.

The brake fluid is sucked from the reservoirs 25a and 25b and supplied towards the conduits 3a and 16a, nearly at the same rate by the fluid pressure pumps 20a and 20b. Accordingly, the fluid pressures of the output chambers 50a and 50b at both sides of the piston 38 are decreased nearly at the same rate. The piston 38 remains stopped at the neutral position, and the valve balls 47a and 47b remain separated from the valve seats 46a and 46b.

When the control signals Sa and Sb become middle level "½", the valves 4a and 4b take the second position B. The conduits 3b, 16a are interrupted from the conduits 5, 17. Further, the conduits 5, 17 are interrupted from the conduits 60a, 60b. Thus the brake fluid pressure of the wheel cylinders 7a, 7b, 12a and 12b is maintained at constant. The fluid pressure pumps 20a and 20b continue to supply brake fluid towards the conduits 3 and 16.

When the skid conditions of the wheels 6a, 6b, 11a and 11b are removed, the control signals Sa and Sb become again low level "0". The valves 4a and 4b take the position A. The master cylinder side is made to communicate with the wheel cylinder side. The braking forces to the wheels 6a, 6b, 11a and 11b again increases.

Hereafter, the above-described operations are repeated. When the running speed of the vehicle reaches the desired speed, or when the vehicle stops, the brake pedal 2 is released from treading. The brake fluid is returned from the wheel cylinders 7a, 7b, 12a, 12b to the master cylinder 1 through the conduits, the valve apparatus 8 the valves 4a, 4b, the check valves 19a and 19b.

In the above description, the control signals Sa and Sb become "0", "1" or "½" at the same time. However, when the frictional coefficients of the road are considerably different at the right and left sides, the control signals Sa and Sb do not become "0", "1", or "½" at the same time. For example, when the frictional coefficient of the right side of the road is relatively small, the control signal Sa first becomes "1". Next, such a case will be described.

The operations at the beginning of the braking are the same as above described. When the control signal Sa becomes "1", the valve 4a takes the position C. Pressurized fluid is discharged into the reservoir 25a from the wheel cylinders 7a and 12b.

In the valve apparatus 8, the fluid pressure is decreased in the input and output chambers 49a and 50a at the left side of the piston 38. On the other hand, the brake fluid continues to be supplied to the wheel cylinders 7b and 12a from the master cylinder 1. Accordingly, the leftward pushing force to the piston 38 becomes larger. The piston 38 is moved leftwards. Thus, the right valve ball 47b comes to seat the valve 46b by spring action of the spring 48b. On the other hand, the left valve ball 47a is further separated from the valve 46b by the rod portion 44b. The left input chamber 49a remains in communication with the left output chamber 50a, while the right input chamber 49b is interrupted from the right output chamber 50b. Thus, the fluid supply to the wheel cylinder 12a of the one rear wheel 11a is interrupted from the master cylinder 1.

When the piston 38 is further moved leftwards with the decrease of the fluid pressure of the left input and output chambers 49a and 50a, the volume of the right output chamber 50b interrupted from the right input chamber 49b is increased. In other words, the fluid pressure of the wheel cylinder 12a of the rear wheel 11a is lowered since the wheel cylinder 12a communicates with the right output chamber 50b through the output port 14 and the conduit 15., When the control signal Sa becomes again "0" to increase the fluid pressure of the input and output chambers 49a and 50a, the piston 38 is moved rightwards to decrease the volume of the right output chamber 50b, while the right valve ball 47b seats the valve seat 46b. Thus, the brake fluid pressure of the wheel cylinder 12a of the rear wheel 11a is again increased. The above-described operation means that the brake fluid pressure of the wheel cylinder 12a of the rear wheel 11a at the same side as the front wheel 6a is controlled in accordance with the brake fluid pressure of the wheel cylinders 7a of the front wheel 16a. Thus, the rear wheel 11a running on the lower frictional coefficient side of the road is prevented from locking, similarly to the front wheel 6a at the same side. If the brake fluid pressure of the wheel cylinder 12a of the rear wheel 11a is controlled in common with the brake fluid pressure of the wheel cylinder 7b of the front wheel 6b running on the higher frictional coefficient side, the rear wheel 11a would be locked.

When the control signal Sa becomes "½", the fluid pressures of the wheel cylinders 7a and 12b of the front and rear wheels 6a and 11b are maintained at constant. And when the other control signal Sb is still "0", the fluid pressures of the wheel cylinder 7b of the other front wheel 6b continues to rise. Accordingly, the pressure of the input chamber 49b becomes higher than that of the other input chamber 49a in the valve apparatus 8. And so the piston 38 moves leftwards, and the valve ball 47b comes to contact with the valve seat 46b. Hereafter, the pressure of the output chamber 50b does not rise, and is maintained at constant. Accordingly, although the fluid pressure of the wheel cylinder 12a of the right rear wheel 11a initially becomes a little higher than that of the left rear wheel 11b, it is maintained at constant a little later.

Next, there will be described the case that one of the two conduit systems fails.

For example, when brake fluid leaks from the one conduit system including the conduit 3, the fluid pressures of the wheel cylinders 7a and 12b do not increase by treading the brake pedal 2. On the other hand, the fluid pressure of the other conduit system including the conduit 16 increase by treading the brake pedal 2. Accordingly in the valve apparatus 8, the fluid pressure of the one master cylinder pressure chamber 55b rises, while that of the other master cylinder pressure chamber 55a remains zero. Thus, the fluid pressures to both sides of the one larger-diameter portion 41a of the piston 38 are zero. Those to both sides of the other larger-diameter portion 41b of the piston 38 are not zero, and substantially equal to each other. As the result, the piston 38 is not moved, and remains located at the shown neutral position. Accordingly, the valve ball 47b remains separated from the valve seat 46b.

Thus, in the right conduit system, the pressurized fluid is supplied from the master cylinder 1 into the wheel cylinder 7b of the left front wheel 6b through the conduits 16, 16a, the valve 4b and the conduit 17. Further, it is supplied from the master cylinder 2 into the wheel cylinder 12a of the right rear wheel 11a through the conduit 17a, the input chamber 49b of the valve apparatus 8 the output chamber 50b thereof (the valve ball 47b opened), and the conduit 15. Thus, the braking force can be securely obtained in the one conduit system.

When the valve 4b is changed over into the position B or C with the tendency of the locking of the front or rear wheel 6b or 11a, the fluid pressure of the input and output chambers 49b and 50b becomes lower than that of the master cylinder pressure chamber 55b, in the valve apparatus 8, and so the piston 38 is moved rightwards with the fluid pressure difference between both sides of the larger diameter portion 41b. Accordingly, the valve ball 47b is moved further rightwards and separated far from the valve seat 46b. The valve ball 47b remains separated.

When the valve 4b is changed over into the position B, the wheel cylinders 7b and 12a of the wheels 6b and 11a are interrupted both from the master cylinder and from the reservoir 25b, so that the fluid pressure of the wheel cylinders 7b and 12a increases with the rightward movement of the piston 38, since the volume of the input and output chambers 49b and 50b decreases therewith.

When the valve 4b is changed over into the position C, the wheel cylinders 7b and 12a of the wheels 6b and 11a are interrupted from the master cylinder side, but communicate with the reservoir side. Thus, the braking forces of the front and rear wheels 6b and 11a are decreased, so that the wheels are prevented from locking.

As above described, the braking force can be securely obtained in the one right conduit system, even when the other conduit system fails. The special sleeve and piston are not required for opening the valve ball in the one right conduit system, as in the prior art. Accordingly, the fluid amount for moving the special sleeve and piston is not needed, and the stroke of the brake pedal 2 does not become excessive.

Next, operations of the control unit 31 according to this invention will be described.

It is now assumed that the road is normal in frictional coefficient and the frictional coefficient of the right side is smaller (low side). The brake pedal 2 is trodden. At time t1, the right rear wheel 11a reaches the predetermined deceleration threshold, and so the signal −b is generated from the deceleration signal generator corresponding to the deceleration signal generator 63a of FIG. 4 in the judge circuit for the right rear wheel 11a. Although FIG. 4 shows the judge circuit for the right front wheel 11a, the same reference symbols will be hereinafter used for the corresponding elements or circuit blocks for the convenience of the description.

The signal −b is supplied to the OR gate 71a, and the movable contact of the change-over circuit 70a is changed over to the output side of the multiplier 67, by the output of the OR gate 71a. The signal −b is further supplied to the third input terminal of the OR gate 82a. The output of the OR gate 82a generates the output signal EV HR through the AND gates 83a and 84a, and further the output signal EAHR through the OR gate 85a.

Figure 9:
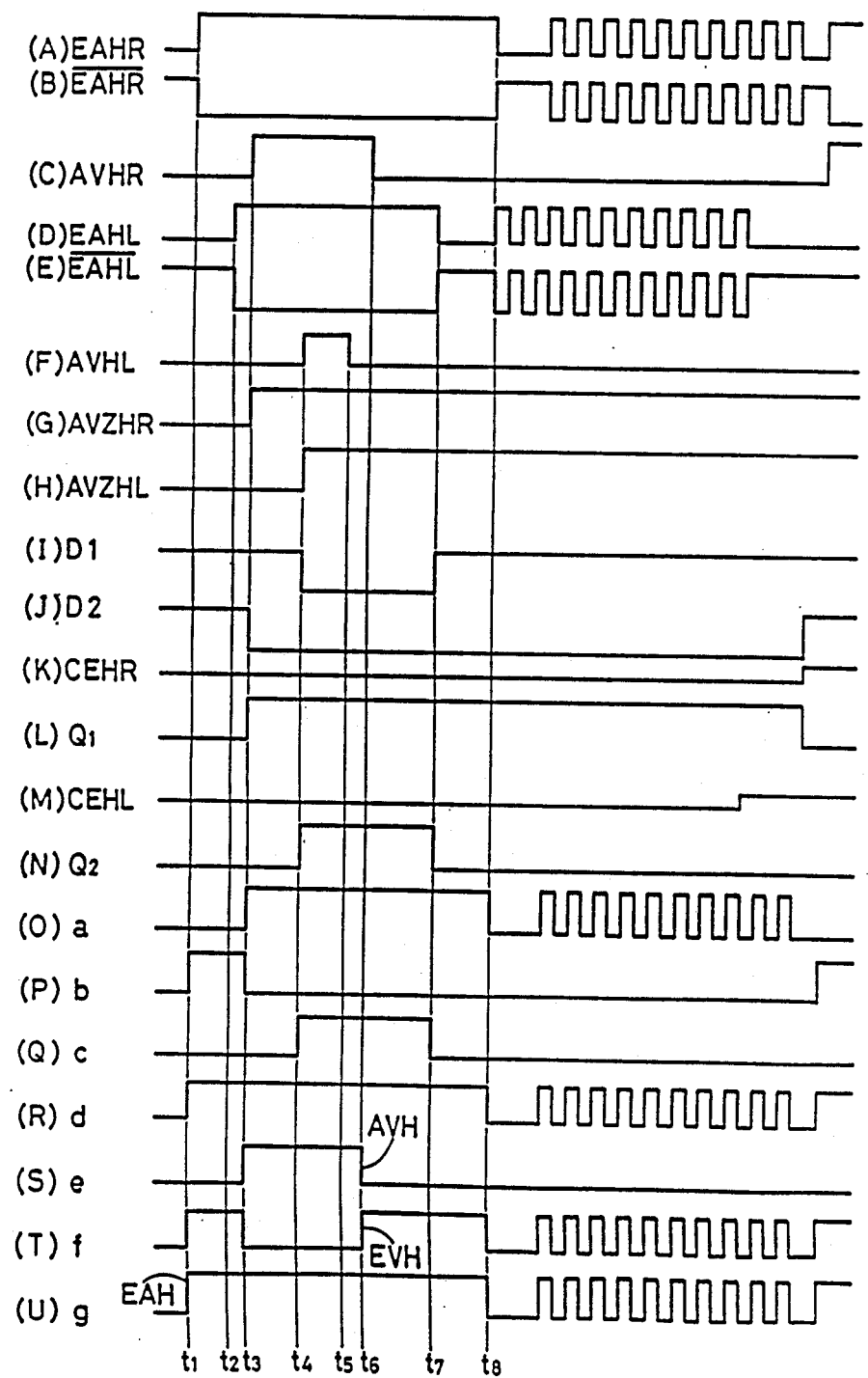
FIG. 9 is time charts of the respective signals for explaining operations of the embodiment of this invention.

As shown in FIG. 9A, the signal EAHR becomes "1" at time t1. In FIG. 5, the $Q_1$, $Q_2$ outputs of the flip-flops 89a, 89b are "1", and the signal EVHR is now supplied to the AND gate 92. Accordingly, the output b of the AND gate 92 becomes "1", and so both of the outputs d and f of the OR gate 94 and AND gate 95 become "1". Thus, the signal EVH becomes "1". Thus, at time t1, the outputs b, d and f becomes "1", as shown in FIG. 9 P.R.T. Accordingly, the output g of the OR gate 97 becomes "1". Thus, the signal EAH becomes "1", in FIG. 5.

Figure 5:
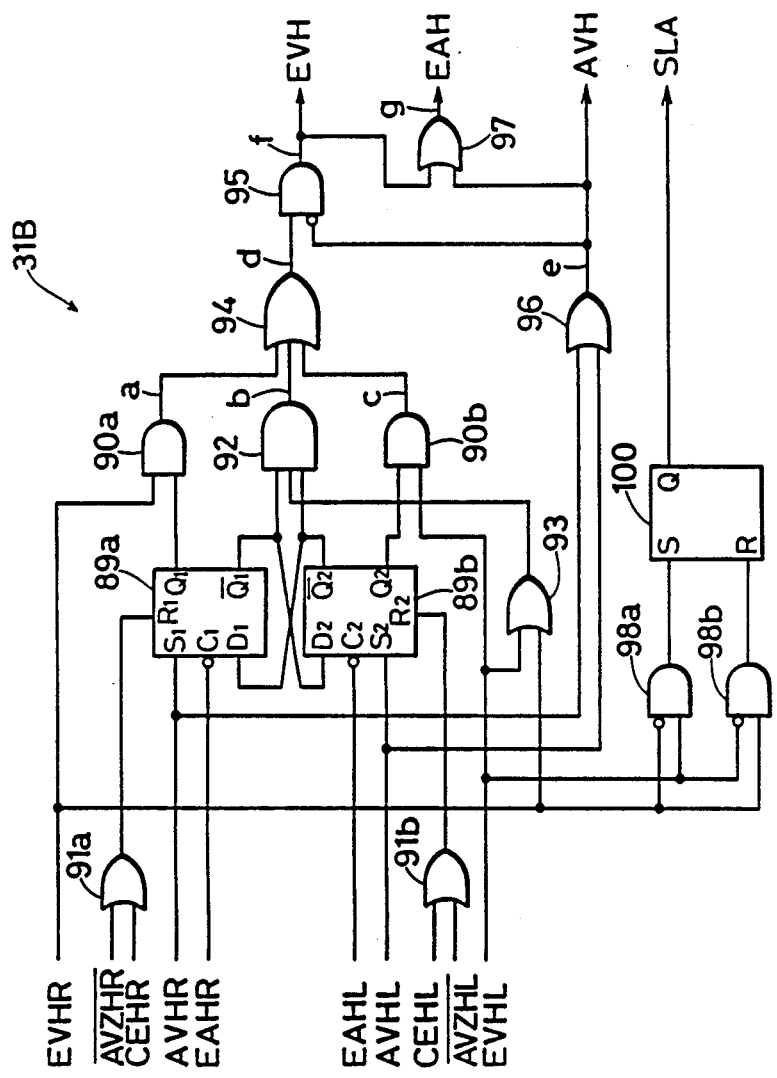
FIG. 5 is a circuit diagram of a selection part in FIG. 2.

Further, in FIG. 5, the signal EVHR is supplied to the AND gates 98a and 98b. Since the signal EVHL is still "0", the output of the AND gate 98b becomes "1", while that of the other AND gate 98a remains "0". Accordingly, the signal SLA remains "0". The right side of the road is judged to be "low side", by that fact.

In FIG. 7, the signal EVH is supplied to the one input terminal of the AND gate 104a. However, since the Q output of the flip-flop 102a to the other input terminal of the AND gate 104a is still "0", the output of the AND gate 104a is "0". The signal EVH is supplied to the input terminal of the AND gate 104b, too. However, since the Q output of the flip-flop 102b is similarly "0", also the output of the AND gate 104b is "0".

The signal EAH is supplied to the negation clock terminals C of the flip-flops 102a, 102b. However, since it is negated, the Q outputs of the flip-flops 102a, 102b remain "0".

The signal SLA is supplied to the AND gates 114a, 114b, and it is now "0". The negated signal SLA is supplied to the one AND gate 114b. Accordingly, the output of the AND gate 114b becomes "1", and therefore, the output of the OR gate 107b becomes "1". The input to the second input terminal of the AND gate 108b becomes "1". Since the Q outputs of the flip-flops 101b, 102b are "1", the output of the AND gate 108b becomes "1". The output of the OR gate 109b, therefore that of the AND gate 110b becomes "1". Thus, the output signal EV becomes "1". Accordingly, the control signal Sa of the current level "½" is supplied to the solenoid portion 30a of the change-over valve 4a. Thus, the braking forces to the right wheel 6a and rear wheels 11a as, 11b are maintained at constant.

At time t2, the rear wheel 11b on the "high side" of the road reaches the predetermined deceleration. The signal EVHL, therefore, EAHL is generated, as shown in FIG. 9D. It is supplied to the other input terminal of the OR gate 93. The signal EVHR is already supplied to the other input terminal of the OR gate 93. Since it is maintained, the output of the OR gate 93, therefore, that b of the AND gate 92, that d of the OR gate, and the output signals EVH, EAH are unchanged as "1", as shown in FIG. 9 (D)(R)(T)(U). The output of the AND gate 98b becomes "0". However, the output of the other AND gate 98a remains "0". Accordingly, the Q output of the flip-flop 100 remains "0". Thus, the right side of the road is judged surely to be still "low side".

At time t3, the right rear wheel 11a generates the signal AVHR as shown in FIG. 9(C). It reaches the predetermined slip. The slip signal λ is generated from the slip signal generator 72a of the judge circuit for the right rear wheel 11a. It is supplied to the one input terminal of the AND gate 73a. Since the first acceleration signal $+b_1$ is not generated, the output of the AND gate 73a becomes "1". Thus, the signal AVHR is generated. At the same time, the output of the AND gate 84a or signal EVHR becomes "0". However, the output of the OR gate 95a or the signal EAHR continues to be "1", as shown in FIG. 9A. In FIG. 5, the signal SLA remains "0".

Figure 4:
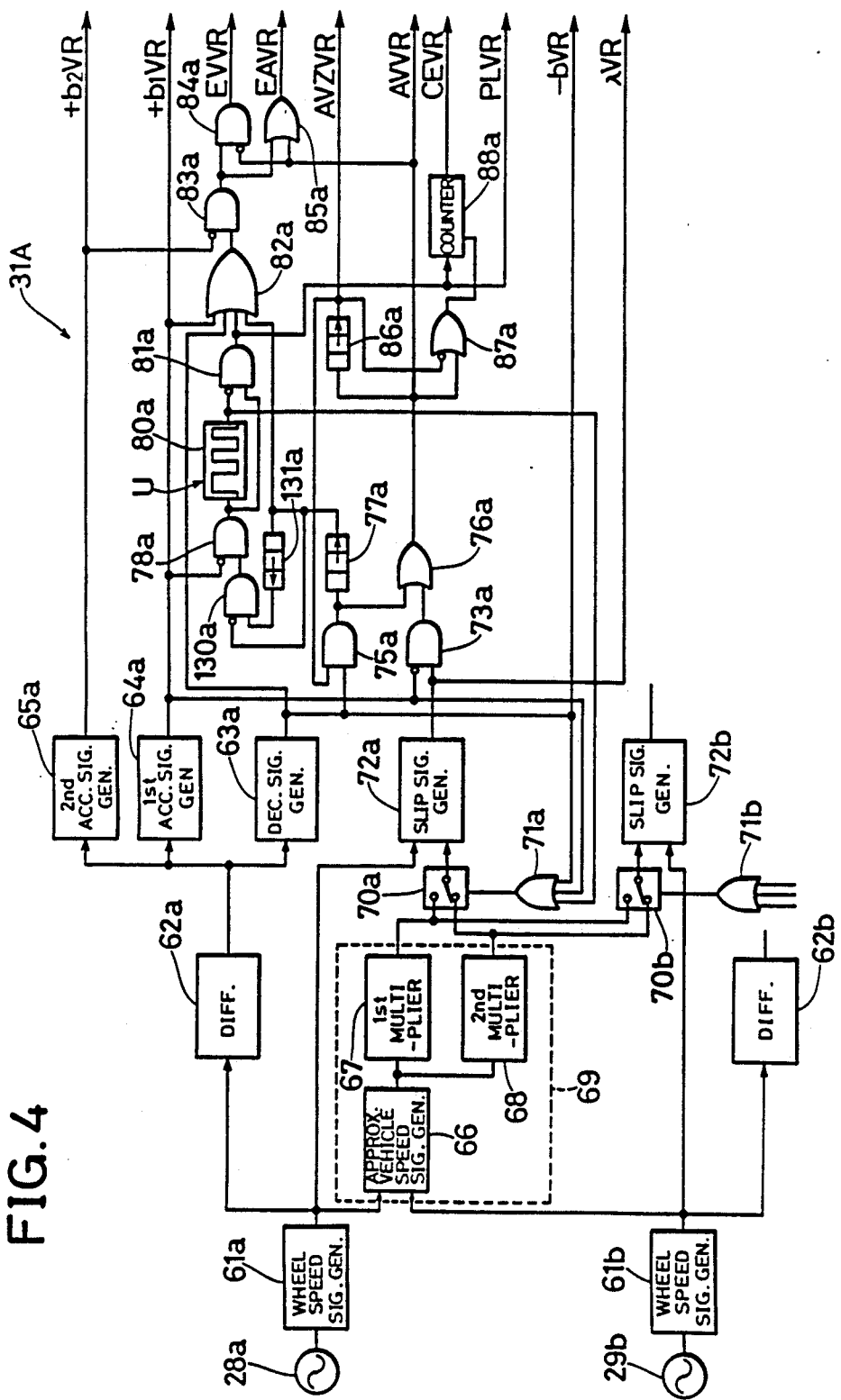
FIG. 4 is a circuit diagram of a judge part in FIG. 2.

In FIG. 4, the slip signal is supplied to the OFF delay timer 86a. The output of the OFF delay timer 86a is supplied to the one input terminal of the AND gate 75a. Accordingly, hereinafter when the deceleration signal —b is generated, the output of the AND gate 75a, therefore that of the OR gate 76a becomes "1". Thus the signal AVHR is generated. Further also after the signal —b disappears, the output of the OFF delay timer 77a connected to the output terminal of the AND gate 75a is maintained at the level "1" for the delay time of the OFF delay timer 77a.

Figure 8:
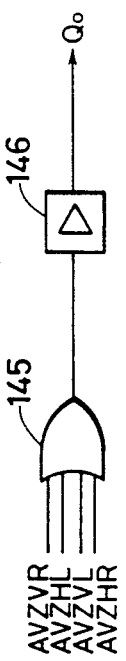
FIG. 8 is a circuit diagram of a motor drive circuit in FIG. 2.

The output of the OR gate 76a is supplied to the OFF delay timer 86a. Accordingly, the signal AVZHR is generated as shown in FIG. 9. In FIG. 8, the motor drive signal Qo is generated from the amplifier 146. The motor 22 starts to be driven in FIG. 1.

In FIG. 5, the signal AVHR is supplied to the set terminal S1 of the flip-flop 89a. The $Q_1$ output thereof becomes "1". The $\overline{Q_1}$ output thereof becomes "0". Accordingly, the input to the data terminal D2 of the other flip-flop 89b, as shown in FIG. 9J becomes Q. The output of the OR gate 96, therefore the signal AVH is generated as shown in FIG. 9.S. The signal EVH becomes "0". However, the signal EAH continues to be "1", as shown in FIG. 9U.

In FIG. 7, the signal AVHR is supplied to the set terminals of the flip-flop 102b. The Q output thereof becomes "1", and it is supplied to the one input terminals of the AND gates 104b, and 112b. The input signal EVH to the other input terminal of the AND gate 104b is "0", while the input signal AVH to the other input terminal of the AND gate 112b are "1". Accordingly, the output of the AND gate 104b remains "0", while that of the AND gate 112b becomes "1". The output signal AV is obtained. Thus, the control signal Sa of the current level "1" is supplied to the solenoid portion 30a of the change-over valve 4a in FIG. 1. Thus, as described in the operations of the valve apparatus 8, the brakes of the right front wheel 6a and rear wheels 11a, 11b are relieved. The Q output of the one flip-flop 102b is "1", while that of the other flip-flop 102a is "0". Now the right side of the road is judged to be "low side" by that fact.

At time t4, the other rear wheel 11b reaches the predetermined slip during the continuation of the signal AVHR as shown in FIG. 9C. Thus, the signal AVHL is generated as shown in FIG. 9F. In FIG. 5, it is supplied to the set terminal S2 of the flip-flop 89b. Accordingly, the Q2 output thereof becomes "1" and the $\overline{Q_2}$ output thereof becomes "0". Thus, the input to the data terminal D1 of the flip-flop 89a becomes "0" as shown in FIG. 9I.

The signal AVHL is supplied to the one input terminal of the OR gate 96, too. Since the signal AVHR continues to be supplied to the other input terminal of the OR gate 96, the signal AVH remains "1". In FIG. 7, the signal AVHL is supplied to the set terminal S of the flip-flop 102a. However, since the Q output of the flip-flop 102b is supplied through the OR gate 106a to the reset terminal R of the flip-flop 102a, the Q output of the flip-flop 102a remains "0" due to the reset priority. Thus, the output of the AND gate 112a remains "0". The output signal AV for the left side is not generated. The brake of the left front wheel 6b is not relieved. However, when the left front wheel 6b generates the signal AVHL, it is independently controlled for brake relief, since the signal AVVL is supplied to the OR gate 111a. Thus, the braking distance can be much shortened with the arrangement of this embodiment of the invention.

The signal AVZHL becomes "1" with the signal AVHL, as shown in FIG. 8. However, since the AVZHR has become "1", the output of the OR gate 145 has become "1". The output Qo is not influenced, and remains "1". The motor 22 continues to be driven. At time t5, the signal AVHL becomes "0". However, it has no influence on the other signals.

At time t6, the slip signal λ of the right rear wheel 11a disappears. Accordingly, the signal AVHR becomes "0" as shown in FIG. 9C. In FIG. 4, the input to the one input terminal of the OR gate 85a becomes "0". However, after the signal —b disappears, the output of the OR gate 82a is still "1" because of the delay time of the OFF delay timer 77a. Accordingly, the output of the AND gate 84a, therefore the signal EVHR becomes again "1" with the disappearance of the signal AVHR. The output to the OR gate 85a, therefore the signal EAHR continues to be "1" as shown in FIG. 9A.

In FIG. 5, the signal AVHR becomes "0". However, since the output of the OR gate 91a is still "0", the flip-flop 89a is not reset, but the $Q_1$ output thereof remains "1" as shown in FIG. 9L. The signal EVHR is still "1". Accordingly, the output a of the AND gate 90a remains "1", as shown FIG. 9O. The output e of the OR gate 96 becomes "0". Accordingly, the output f of the AND gate 95, therefore the signal EVH becomes again "1" from "0" as shown in FIG. 9T. The output signal EAH of the OR gate 97 remains "1".

In FIG. 7, the input to the set terminals of the flip-flop 102b becomes "0". However, since the input to the reset terminal R thereof is "0", the Q output thereof remains "1". Since the signal EVH becomes again "1", the output of the AND gate 104b, therefore that of the OR gate 109b becomes "1". On the other hand, the input AVH to the one input terminal of the AND gate 112b becomes "0". Accordingly, the output thereof becomes "0", and the output signal AV disappears. With the disappearance of the output signal AV, the other output signal EV becomes "1". In FIG. 1, the change-over valve 4a is changed over to the position B, and the braking forces to the right front wheel 6a and the rear wheels 11a, 11b are maintained at constant.

In FIG. 4 when the deceleration signal −b disappears, and the delay time of the OFF delay timer 77a lapses, the input to the fourth input terminal of the OR gate 82a becomes "0". However, it is assumed that the left rear wheel 11b reaches the predetermined first acceleration before the lapse of the delay time of the OFF delay timer 77a. Accordingly, the input to the first input terminal of the OR gate 82a becomes "1", and the signal EAHL continues to be "1" as shown in FIG. 8D, as long as the first acceleration signal +b1 is generated, although the output of the OFF delay timer 77a becomes "0". At time $t_7$ when the first acceleration signal +b1 disappears, the signal EAHL become "0".

In FIG. 5, the input to the clock terminal C2 becomes "0". It is inverted or negated and supplied to the clock terminal C2. The input "0" is supplied to the data terminal D2, and it is read out with the negated input to the clock terminal C2. Thus, the Q2 output becomes "0" as shown in FIG. 9N. Accordingly, the $\overline{Q_2}$ output becomes "1". The $Q_1$ output of the other flip-flop 89a remains "0". Accordingly, the output b of the AND gate 92 remains "0". The output c of the AND gate 90b becomes "0" with the disappearance of the Q2 output of the flip-flop 89b, as shown in FIG. 9Q.

On the other hand, the Q1 output of the flip-flop 89a remains "1", and the right rear wheel 11b still generates the signal EVHR. Accordingly, the output a of the AND gate 90a continues to be "1", and the signal EVH remains "1" as shown in FIG. 9T.

In FIG. 4, as soon as the first acceleration signal +b, disappears, the pulse generator 80a is driven for the delay time of the OFF delay timer 131a. The signal EVHL, and EAHL are interrupted to form rectangular waves as shown in FIG. 8D, from time t8. In FIG. 5, the one input to the OR gate 93 and the one input to the AND gate 90b are rectangular waves. However, the Q2 output of the one flip-flop 89b is "0", and the Q1 output of the other flip-flop 89a is "0". Accordingly, the output EAH of the OR gate 97, and the output EVH of the AND gate 95 are not interrupted to form rectangular waves, but they continue to be "1" with the signal EVHR. Accordingly, the braking forces to the right front wheel 6a and rear wheels 11a, 11b are still maintained at constant.

When the right rear wheel 11b generates the first acceleration signal +b, after time t7, the signal EVHR and EAHR continue to be "1" although the delay time of the OFF delay timer 77a. The braking forces to the right front wheel 6a and rear wheels 11a, 11b are still maintained at constant. However, at time t8 when the first acceleration signal +b, disappears, the pulse generator 80a is driven, and the signal EAHR are rectangular waves that are pulsed on and off as shown in FIG. 9A. Thus, in FIG. 5, the signals EVH and EAH are rectangular waves.

Accordingly, in FIG. 7, the output of the AND gate 104b are changed to a rectangular wave.

The braking forces to the right front wheel 6a and rear wheels 11a, 11b are stepwisely increased.

When the counted pulses reach the predetermined value, the output CEHR of the counter 88a (in FIG. 4) in the judge circuit for the right rear wheel 11a becomes "1". Accordingly, in FIG. 6, the input of the third input terminal of the OR gate 106b becomes "1". The output of the OR gate 106b is supplied to the reset terminal R of the flip-flops 102b to reset the latter. The Q output thereof becomes "0". Although the pulses continue, the stepwise increase of the braking forces is stopped. When the Q output of the flip-flop 102b becomes "0", the other flip-flop 102a is released from the reset condition.

In FIG. 4, when the signal +b, is generated after the disappearance of the output of the OFF delay timer 77a, the step-wise brake increase is stopped, and the brake is maintained at constant. When the signal $+b_1$ disappears, the step-wise brake increase is again effected for the remaining time of the OFF delay timer 131a.

Hereafter, if the right side of the road is still "low side", the above operations are similarly repeated. When the "low side" is inverted on the road, or when the left side of the road becomes "low side", operations similar to the above described operations for the right front wheel 6a and rear wheels 11a, 11b are effected for the left front wheel 6b and rear wheels 11a, 11b.

Further the "low side" is so designed as to be changed over in the case that the rear wheel 11b running on the "high side" generates the brake relieving signal or pressure decreasing signal AVHL while both of the braking forces to the front and rear wheels 6a, 11a, are stepwisely increased. In FIG. 7, while the signals PLVR and PLHR (outputs of the pulse generators 80a) are changed as "1", "0", 1", . . . , the signal AVHL becomes "1". The output of the AND gate 113b therefore that of the OR gate 106b becomes "1", and it is supplied to the reset terminal R of the flip-flop 102b. The Q output thereof becomes "0". Accordingly, the output of the OR gate 106a becomes "0", and the input to the reset terminal R of the flip-flop 102a becomes "0". On the other hand, the signal AVHL is supplied to the set terminals of the flip-flop 102a. The Q output thereof becomes "1". Thus, the "low side" is changed over.

In the above, the case has been described that the right side is frictionally lower on the normal frictional road. Next, there will be described the case that the right side is frictionally lower on the very high frictional road.

Figure 10:
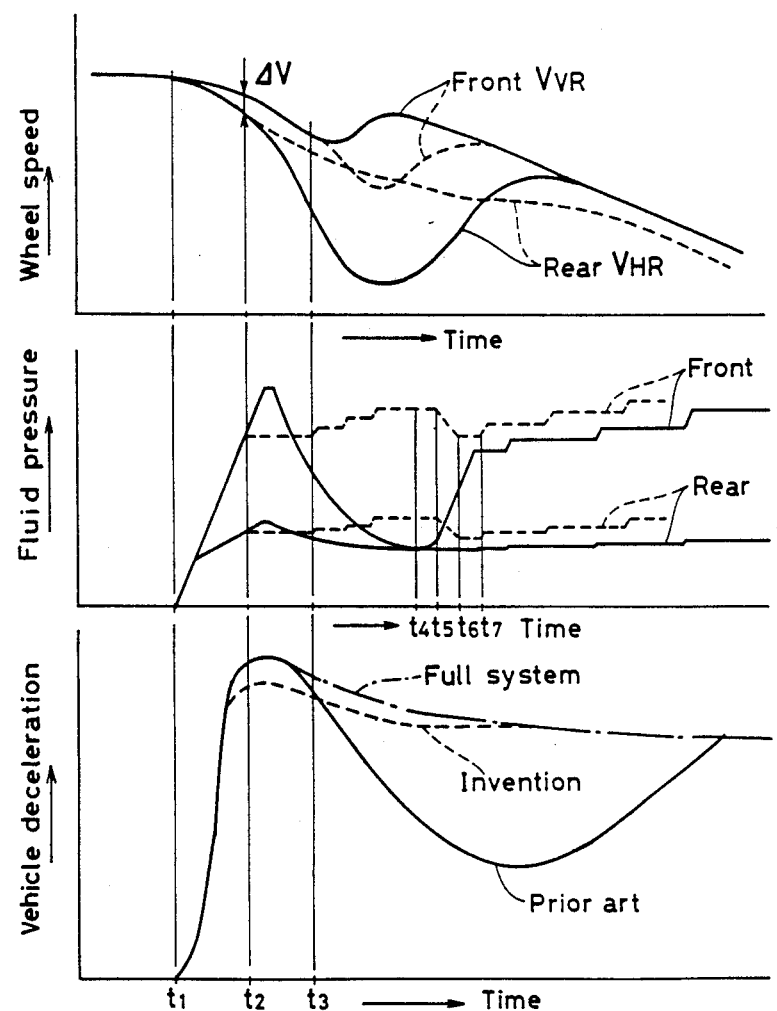
FIG. 10 is graphs for explaining operations of the embodiment of this invention.

At time $t_1$, the brake pedal 2 is rapidly trodden. As shown in FIG. 10A, the wheel speeds $V_{VR}$ and $V_{HR}$ of the right front and rear wheels 6a and 11a are rapidly decreased. The decreasing speed of the wheel speed $V_{HR}$ of the right rear wheel 11a is larger than that of the wheel speed $V_{VR}$ of the right front wheel 6a, because of the swing ("nose dive") of the vehicle around the center of the gravity thereof. Accordingly, the wheel speed difference ($V_{VR} - V_{HR}$) becomes larger at time t2 than the predetermined reference value $\Delta V$.

In FIG. 6, the output of the subtractor 120b becomes larger than the reference value $\Delta V$ set in the reference generator 122b. The output of the comparator 121b becomes "1". On the other hand, since the right front and rear wheels 6a and 11a do not yet generate the brake decreasing signal AVVR and AVHR, the output of the NOR gate 124b is "1". Accordingly, the output EV2 of the AND gate 123b becomes "1".

In the second logic part 31D of FIG. 7, the output EV2 is supplied to the third input terminal of the OR gate 144b. Accordingly, the output thereof, therefore the output EV of the last stage AND gate 110b is generated. Thus, the control signal Sa of the level "½" is generated from the control unit 31. The change-over valve 4a takes the position B. Thus, the braking forces to the right front and rear wheels 6a and 11a are maintained at constant, as shown by the dash-lines in FIG. 10B.

At time t3, the wheel speed difference ($V_{VR} - V_{HR}$) becomes smaller than the reference value $\Delta V$. Accordingly, the output of the comparator 121b again becomes "0" in FIG. 6. Thus, the output EV2 of the AND gate 123b becomes "0". However, the output of the AND gate 141b is maintained at the level "1" for the delay time of the OFF delay timer 140b. The pulse generator 142b is driven to increase stepwisely the brake pressures to the right front and rear wheels 6a and 11a, as shown by the dashed lines in FIG. 10B.

At time t4, the right front wheel 11a generates the deceleration signal —b. Thus, in FIG. 7, the signal EVVR is supplied to the OR gate 107b. The $\overline{Q}$ outputs of the flip-flops 101b and 102b are still "1". Accordingly, the output "1" of the OR gate 107b is supplied through the AND gate 108b and OR gates 109b and 144b to the AND gate 110b. The output EV is generated from the AND gate 110b. Thus, the control signal Sa of the level "½" is generated from the control unit 31. The braking forces to the right front wheel 6a and rear wheels 11a, 11b are maintained at constant in spite of the delay time of the OFF delay timer 140b.

At time t5, the right front wheel 6a generates the brake pressure decreasing signal AVVR. Thus, output of the OR gate 111b becomes "1" in FIG. 7. The control signal Sa of the level "1" is generated from the control unit 31 in FIG. 1. The change-over valve 4a takes the position C. The braking forces to the right front wheel 7a and rear wheels 11a 11b are decreased, as shown by the dash-lines in FIG. 10B. Since the pressure-reducing proportional valves 51a and 51b are arranged at the side of the rear wheels 11a, 11b, the change magnitudes of the brake increase and decrease are smaller for the rear wheels than for the front wheels, as shown in FIG. 10B.

At time t6, the signal AVVR disappears. The brake fluid pressure is maintained at constant, as shown by the dash-lines in FIG. 10B. At time t7 before which the first acceleration signal is generated and then disappears, the brake pressure is again stepwisely increased.

In the above, the case has been described that the wheel speed difference of the front and rear wheels at the same side becomes larger than the predetermined value before the signals AVVL, AVHL or AVVR, AVHR are generated. Further according to this embodiment, when the rear wheel generates the deceleration signal before the signals AVVL, AVHL or AVVR, AVHR are generated, the braking force is maintained at constant during the generation of the deceleration signal and for the predetermined time after the disappearance of the same signal, and after the lapse of the predetermined time, the braking force is stepwisely increased for the second predetermined time.

For example, when the right rear wheel 11a generates the deceleration signal, the output of the OFF delay timer 132b, therefore that EV2 of the AND gate 123b become "1". The above described operations are effected hereinafter.

In the above cases, when the brake decreasing signal is generated, the brake is immediately relieved even during the brake holding or step-wise brake increasing.

The advantages of this embodiment over the prior art are as follows:

When the brake pedal is rapidly trodden on the very high frictional road in the prior art, the front and rear wheel speeds $V_{VR}$, $V_{HR}$ change with time, as shown by the solid lines in FIG. 10A, so that the brake fluid pressures are changed with time, as shown by the solid lines in FIG. 10B. The wheel speed $V_{HR}$ and deceleration of the rear wheel are rapidly decreased. The brake decreasing signal is generated for a long time. Accordingly, the decreasing time of the brake fluid pressure is long, as shown by the solid lines in FIG. 10B. The pressure decreasing amount of the front wheel is very large.

Further in the prior art, the recovery of the rear wheel is slow after the brake is relieved. The time of the rapid brake increase is considerably long, as shown by the solid lines in FIG. 10B. As the result, the deceleration of the vehicle changes with time, as shown by the solid line in FIG. 10C. As is clear from the graph of FIG. 10C, the person is greatly rocked back and forth in the automobile, and so feels uncomfortable to riding in it.

According to this embodiment, the deceleration of the automobile changes with time, as shown by the dash-line in FIG. 10C. The back and forth rocking magnitude is small, and so the person feels more comfortable riding in the automobile.

The deceleration of the automobile provided with the full control system in which fluid pressure control valve devices are arranged for the respective (front and rear) wheels, and the four wheels are independently controlled in accordance with the respective skid conditions, change with time, as shown by the dot-dash line in FIG. 10C. This embodiment is almost equal to the full control system in the change of the deceleration of the automobile.

Further as clear from FIG. 10B, this embodiment and the prior art are greatly different from each other in the braking amount (the integral of the brake fluid pressure with respect to time). The braking distance of this embodiment is further shorter than that of the prior art.

In the above first embodiment, for example, when the right rear wheel generates the deceleration signal sooner, the brake pressures to the right side wheels are maintained at constant, and then stepwisely increased for the predetermined time. Further, also when the left rear wheel generates the deceleration signal later, the brake controls similar to the above are effected.

According to a second embodiment of this invention, the above brake controls are not effected for the side which generates the deceleration signal later.

Figure 11:
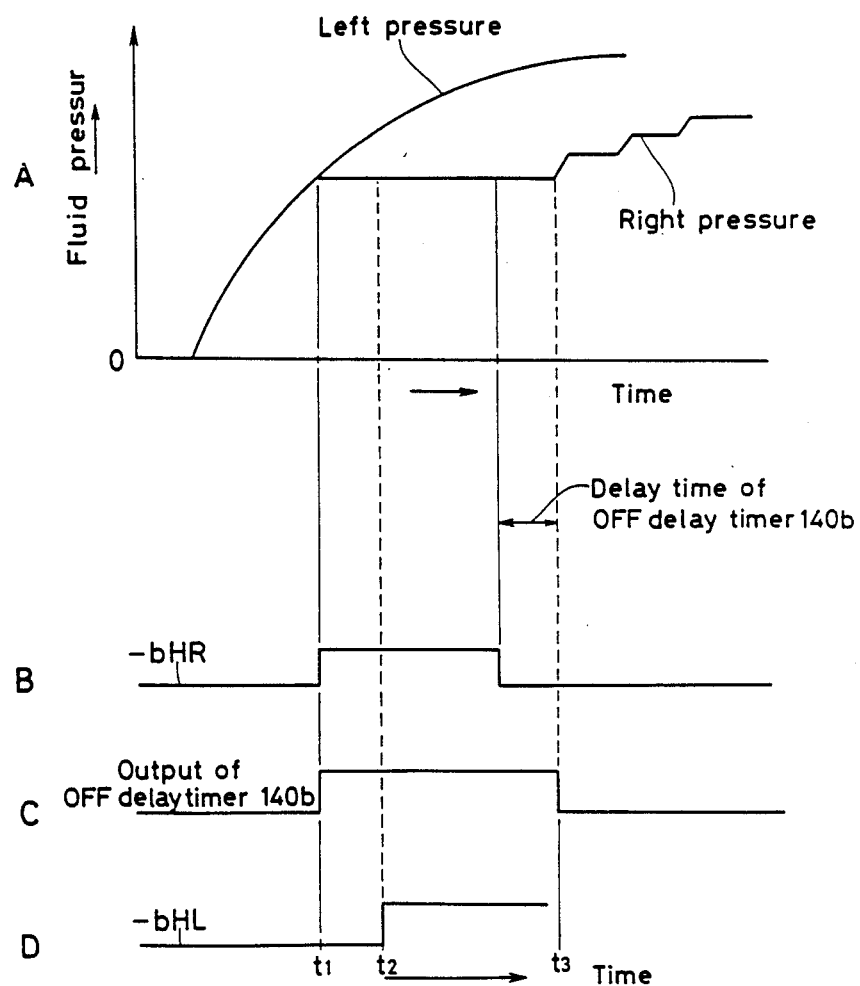
FIG. 11 is graphs for explaining operations of a second embodiment of this invention and FIG. 12 is a circuit diagram of the second embodiment.

As shown in FIG. 11, when the right rear wheel 11a generates the deceleration signal $-b_{HR}$ at time t1, the brake pressure is maintained at constant, as shown in FIG. 11A. At time t2, the left rear wheel 11b generates the deceleration signal —bHL. However, the brake pressure for the left side continues to rise. When the delay time of the OFF delay timer 140b lapses after the disappearance of the deceleration signal, the brake pressure for the right side is stepwisely increased, as shown in FIG. 11A. The first logic circuit 31C is used in the second embodiment, too.

Figure 12:
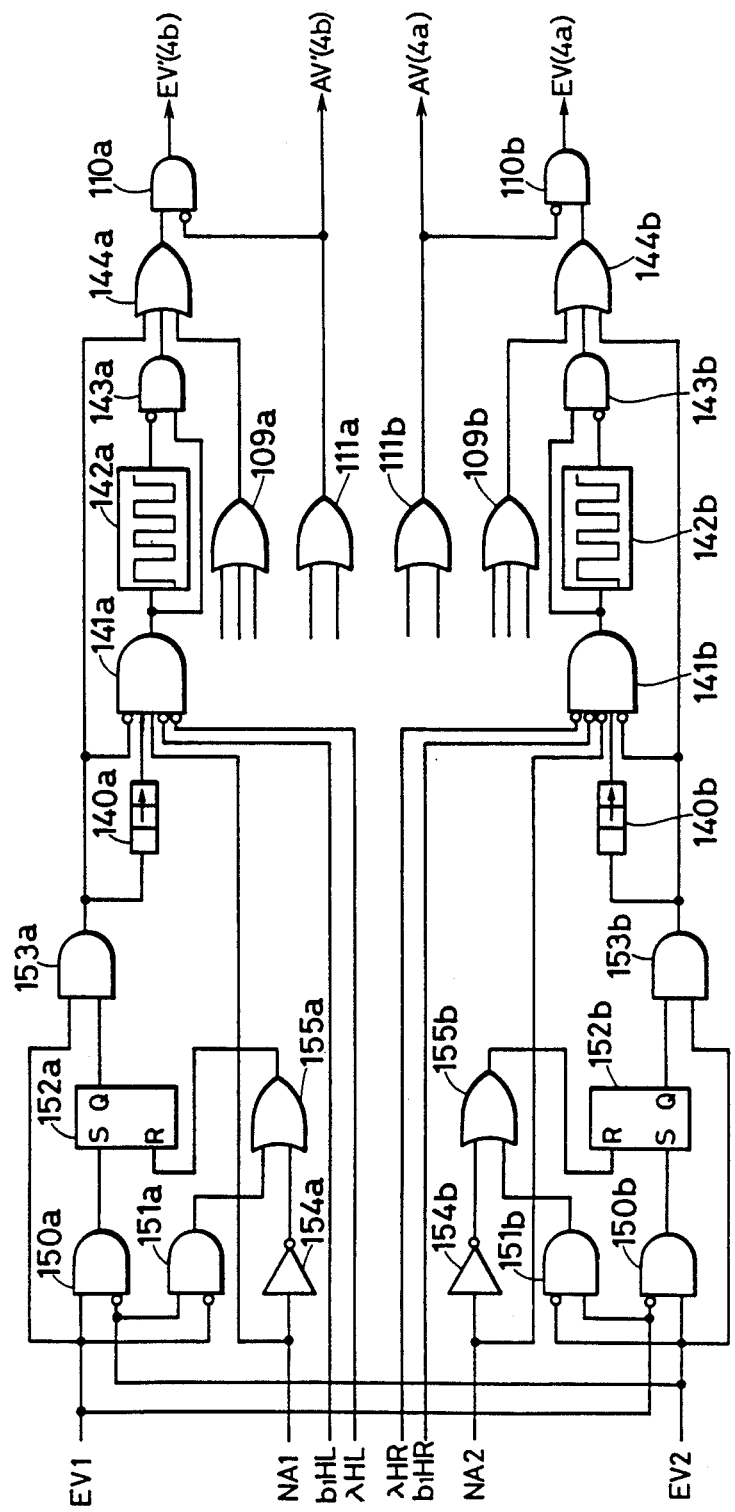

FIG. 12 shows a circuit for effecting the operations of FIG. 11. Although not shown, other parts are the same as shown in FIG. 7.

In FIG. 12, the output signal EV1 from the first logic part 31C is supplied to one input terminal of an AND gate 150a and one negation input terminal of an AND gate 150b. Further, it is supplied to one negation input terminal of an AND gate 151a and one input terminal of an AND gate 151b. The output signal EV2 from the first logic part 31C is supplied to another input terminal of the AND gate 150b and another negation input terminal of the AND gate 150a. Further it is supplied to another negation input terminal of the AND gate 151b and another input terminal of the AND gate Output terminals of the AND gates 151a, 151b are connected to one input terminals of OR gates 155a, 155b. Output terminals thereof are connected to reset terminals R of flip-flops 152a, 152b. The output signals NA1, NA2 are supplied through inverters 154a, 154b to other input terminals of the OR gates 155a, 155b. Q output terminals of the flip-flops 152a, 152b are connected to one input terminal of each of the AND gates 153a, 153b. The output signals EV1, EV2 are supplied to other input terminals of the AND gates 153a, 153b.

The operation of the circuit of FIG. 12 are as follows:

When the right rear wheel 11a generate the deceleration signal sooner, the output signal EV2 becomes "1". The output of the AND gate 150b becomes "1". Thus, the Q output of the flip-flop 152b becomes "1". Therefore, the output of the AND gate 153b becomes "1". Hereafter, the similar operations to the operations of the first embodiment are effected.

Next, the left rear wheel 11b generates the deceleration signal. The output signal EV1 becomes "1". Although the output of the AND gate 150b becomes "0", the Q output of the flip-flop 152b remains "1". Accordingly, the brake control for the right side continues to be effected.

On the other hand, although the signal EV1 is supplied to the one input terminal of the AND gate 150a, the input to the set terminal S of the flip-flop 152a remains "0", since the signal EV2 of the level "1" is supplied to the negation terminal of the AND gate 150a. The input EV2 to the one input terminal of the AND gate 151a is already "1". When the input EV1 to the negation input terminal of the AND gate 151a becomes "1", the output of the AND gate 151a, therefore that of the OR gate 155a becomes "0". Accordingly, the input to the reset terminal R of the flip-flop 152a becomes "0" from "1". However, the Q output thereof remains "0". Thus, the brake pressure for the left side is not controlled, but it continues to rise.

With the above-described arrangements and operations, the braking distance of the second embodiment can be shorter than that of the first embodiment. In the first embodiment, also the braking force for the side which generates the deceleration signal later, is controlled. The total braking amount of the first embodiment is smaller than that of the second embodiment. In the second embodiment, the braking force only for the side which generates the deceleration signal sooner, is maintained at constant, and stepwisely increased. The total braking amount is prevented from being insufficient.

While the preferred embodiments have been described, variations thereto will occur to those skilled in the art within the scope of the present inventive concepts which are delineated by the following claims.

For example, in the above embodiments, the braking force is controlled in use of the selection part 31B and the second logic part 31D. Instead, it may be controlled by use of the well known logic circuits.

In the second embodiment, the braking force for the side which generates the deceleration signal later, is not controlled. Instead, the braking force for the side on which the wheel speed difference between the front and rear wheels becomes larger later than the predetermined value, may be designed so as to be not controlled.

In the above embodiments, the braking force is maintained at constant during the time that the deceleration signal is generated, and for the predetermined time after the disappearance of the decelerating signal, and sequently it is stepwisely increased for the predetermined time. However, it may be maintained at constant only during the time that the deceleration signal is generated, and it may be stepwisely increased for the predetermined time immediately after the disappearance of the deceleration signal.

Further in the above embodiment, the deceleration thresholds set in the deceleration signal generators 63b, 63d for the rear wheels are smaller than those set in the deceleration signal generators 63a, 63c for the front wheels. Instead, two deceleration thresholds may be changeably set in the respective deceleration signal generators for the rear wheels. The larger one of the two deceleration thresholds is equal to the deceleration threshold set in the deceleration signal generators for the front wheels. The smaller one of the two deceleration thresholds is equal to the above described deceleration threshold set in the deceleration signal generators 63b, 63d. When the first brake relieving signal is generated, the deceleration threshold is changed over to the larger from the smaller.

Further in the above embodiment, when the wheel speed difference between the front and rear wheels on the same side becomes larger than the predetermined value before the first brake relieving signal is generated, the braking force is maintained at constant, and when the wheel speed difference becomes smaller than the predetermined value, the braking force is increased step wise for the predetermined time. Instead, when the wheel speed difference becomes larger than the predetermined value, the braking force may be immediately stepwisely increased, and then it may be rapidly increased when the wheel speed difference becomes smaller than the predetermined value.

Further in the above embodiment, when the rear wheel generates the deceleration signal before the first brake relieving signal is generated, the braking force is maintained at constant, and continues to be maintained at constant for the predetermined time also after the disappearance of the deceleration signal, and then it is stepwisely increased for the predetermined time. Instead, when the rear wheel generates the deceleration signal, the braking force may be immediately stepwisely increased, and then it may be rapidly increased with the disappearance of the deceleration signal.

Further in the above embodiment, the brake pressure is stepwisely increased in use of the pulse generator in order to reduce the rising gradient of the brake fluid pressure. Instead, the brake pressure may be linearly increased at a smaller gradient in use of a throttle through which the brake fluid is supplied into the wheel cylinder.

Further in the above embodiment, the braking force is maintained at constant both in the case that the wheel speed difference between the front and rear wheels on the same side becomes larger than the predetermined value, and in the case that the rear wheel generates the deceleration signal, as shown in FIG. 6. However, only one of the above two cases may be used.

Further, in the above embodiment, the pulse generators 80b or 80d, and 142a or 142b are used in the judge part 31A and second logic part 31D. However, one of the pulse generators may be omitted, and the other may be used in common.

What is claimed is:

1. In an anti-skid control apparatus for a vehicle braking system including:
(A) a pair of front wheels, and a pair of rear wheels;
(B) wheel speed sensors associated with said wheels, respectively;
(C) a first fluid pressure control valve device for controlling the brake fluid pressure of the wheel cylinder of one of said front wheels, arranged between a first fluid pressure generating chamber of a tandem master cylinder and said wheel cylinder of the one front wheel;
(D) a second fluid pressure control valve device for controlling the brake fluid pressure of the wheel cylinder of another of said front wheels, arranged between a second fluid pressure generating chamber of said tandem master cylinder and said wheel cylinder of the other front wheel, the improvement comprising:
a control unit receiving outputs of said wheel speed sensors for measuring of judging the skid conditions of said front and rear wheels and for generating instruction for controlling said first and second fluid pressure control valve devices, said control unit including wheel speed signal generators receiving the outputs of said wheel speed sensors and calculating rotational speeds of said wheels, the control unit including
a substractor receiving the outputs of the corresponding ones of said wheel speed signal generators for the front and rear wheels on the same side of the road, and calculating the rotational speed difference between said front and rear wheels on the same side,
a first comparator comparing said rotational speed difference with a reference value and generating output when said rotational speed difference becomes larger than said reference value,
wheel deceleration signal generators receiving the outputs of said wheel speed signal generators and calculating decelerations of said wheels,
a second comparator receiving the output of the rear wheel decelerator signal generator of said wheel deceleration signal generators, comparing the rear wheel deceleration as said output with a reference deceleration value which is smaller than another reference deceleration value for the front wheel, and generating output when said rear wheel deceleration becomes higher than said reference deceleration value; and a logic part generating the instruction which controls said first or second fluid pressure control valve device for said same side so as the maintain the brake fluid pressure to the wheel cylinder at constant or to reduce the rising gradient of the brake fluid pressure to the wheel cylinder, on the basis of the output of said first or second comparator, before said one front or rear wheel one said same side first generates a brake relieving signal as the measuring or judging result of the skid condition; and (F) a valve apparatus for generating a fluid pressure in accordance with the lower one of the brake fluid pressures of said front wheels controlled with said first and second fluid pressure control valve devices, being arranged between said wheel cylinders of the front wheels and those of the rear wheels.

2. An anti-skid control apparatus according to claim 1 in which pressure-reducing proportioning valves are arranged between said valve apparatus and said rear wheels, respectively.

3. An anti-skid control apparatus according to claim 1 or 2 in which said logic part is connected to said first or second fluid pressure control valve device so as to maintain the brake fluid pressure to the wheel cylinder at constant or to reduce the rising gradient of the brake fluid pressure to the wheel cylinder, during the generation of the output of said first or second comparator.

4. An anti-skid control apparatus according to claim 1 or 2 in which said logic part is connected to one of said first and second fluid pressure control valve devices to maintain the brake fluid pressure to the wheel cylinder at constant or to reduce the rising gradient of the brake fluid pressure to the wheel cylinder, during the generation of the output of said first or second comparator, and continuously for a predetermined time after said output disappears.

5. An anti-skid control apparatus according to claim 1 or 2 in which said logic part is connected to one of said first and second fluid pressure control valve devices to maintain the brake fluid pressure to the wheel cylinder at constant during the generation of the output of said first comparator, and to reduce the rising gradient of the brake fluid pressure to the wheel cylinder continuously for a predetermined time after the output of said first comparator disappears.

6. An anti-skid control apparatus according to claim 1 or 2 in which an instruction from said logic part is coupled to said first or second fluid pressure control valve device so as to maintain the brake fluid pressure to the wheel cylinder at constant or to reduce the rising gradient of the brake fluid pressure to the wheel cylinder, during the generation of the output of said first or second comparator, and continuously for a predetermined time after said output disappears, and to reduce the rising gradient of the brake pressure continuously for a second predetermined time.

7. An anti-skid control apparatus according to claim 1 or 2 in which before said one front or rear wheel on said same side first generates a brake relieving signal as the measuring or judging result of the skid condition, said logic part generates the instruction which controls said first or second fluid pressure control valve device for the one side of the road on which the rotational speed difference between the one front and rear wheels becomes larger than said reference value, sooner than one the other side of the road, or on which the one rear wheel deceleration become higher than said reference deceleration value, sooner than on the other side of the road, so as the maintain the brake fluid pressure to the wheel cylinder at constant or to reduce the rising gradient of the brake fluid pressure to the wheel cylinder, and said lock part generates no instruction which controls said second or first fluid pressure control valve device for the other side on which the rotational speed deference between the other front and rear wheels become larger than said reference value, later than on the one side of the road, or on which the other rear wheel deceleration becomes higher than said reference deceleration value, later than on the one side of the road.

8. An anti-skid control apparatus according to claim 7 in which said logic part generates the instruction which controls said first or second fluid pressure control valve device so as to maintain the brake fluid pressure to the wheel cylinder at constant or to reduce the rising gradient of the brake fluid pressure to the wheel cylinder, during the generation of the output of said first or second comparator.

9. An anti-skid control apparatus according to claim 7 in which said logic part generates the instruction which controls said first or second fluid pressure control valve device so as to maintain the brake fluid pressure to the wheel cylinder at constant or to reduce the rising gradient of the brake fluid pressure to the wheel cylinder, during the generation of the output of said first or second comparator, and continuously for a predetermined time after said output disappears.

10. An anti-skid control apparatus according to claim 7 in which said logic part generates the instruction which controls said first or second fluid pressure control valve device so as to maintain the brake fluid pressure to the wheel cylinder at constant during the generation of the output of said first comparator, and to reduce the rising gradient of the brake fluid pressure to the wheel cylinder continuously for a predetermined time after the output of said first comparator disappears.

11. An anti-skid control apparatus according to claim 7 in which said logic part generates the instruction which controls said first or second fluid pressure control valve device so as to maintain the brake fluid pressure to the wheel cylinder at constant or to reduce the rising gradient of the brake fluid pressure to the wheel cylinder, during the generation of the output of said first or second comparator, and continuously for a predetermined time after said output disappears, and to reduce the rising gradient of the brake pressure continuously for a second predetermined time.

* * * * *